United States Patent
McNab Kerr et al.

(10) Patent No.: US 8,960,996 B2
(45) Date of Patent: Feb. 24, 2015

(54) METHOD AND APPARATUS FOR DETERMINING A MIXING REGIME FOR USE IN THE PREPARATION OF ANIMAL FEED FROM A SET OF INGREDIENTS, AND A SYSTEM FOR PRODUCING THE ANIMAL FEED

(75) Inventors: Hugh McNab Kerr, Murthly (GB); John Joseph McCurdy, Gowran (IE); Jérôme Jean-Yves Eon, Saint Pierre de Plesguen (FR); Seth Daniel Wareing, Ingleby Barwick (GB); Timothy John Penfare, Fethard (IE)

(73) Assignee: Salford Engineering Limited, County Carlow (IE)

( * ) Notice: Subject to any disclaimer, the term of this patent is extended or adjusted under 35 U.S.C. 154(b) by 936 days.

(21) Appl. No.: 13/132,073

(22) PCT Filed: Dec. 3, 2009

(86) PCT No.: PCT/IE2009/000086
§ 371 (c)(1),
(2), (4) Date: Nov. 4, 2011

(87) PCT Pub. No.: WO2010/064224
PCT Pub. Date: Jun. 10, 2010

(65) Prior Publication Data
US 2012/0065759 A1 Mar. 15, 2012

(30) Foreign Application Priority Data
Dec. 3, 2008 (IE) .................................. S2008/0961

(51) Int. Cl.
*A01K 5/00* (2006.01)
*A23K 1/18* (2006.01)

(52) U.S. Cl.
CPC ............ *A23K 1/1813* (2013.01); *Y10S 366/603* (2013.01)
USPC ........... 366/141; 366/142; 366/603; 700/265; 119/51.01

(58) Field of Classification Search
USPC ......... 366/302, 306, 307, 314, 318–324, 603, 366/141, 150.1, 297–301; 241/101.76, 241/101.761, 101.8, 260.1, 605; 700/213, 700/265; 701/50; 119/51.01, 51.02
See application file for complete search history.

(56) References Cited

U.S. PATENT DOCUMENTS

| 5,867,820 A | 2/1999 | Cureton et al. |
| 8,146,624 B2 * | 4/2012 | Ghiraldi .......................... 141/83 |

(Continued)

FOREIGN PATENT DOCUMENTS

| EP | 0931454 A1 | 7/1999 | |
| WO | WO 9208344 A1 * | 5/1992 | ............... A01K 5/02 |

OTHER PUBLICATIONS
International Search Report for PCT/IE2009/000086 dated Nov. 17, 2010.

*Primary Examiner* — Charles Cooley
(74) *Attorney, Agent, or Firm* — Sughrue Mion, PLLC

(57) ABSTRACT

A method and apparatus for determining a mixing regime for use in the preparation of an animal feed in which a main computer is programmed to store a master list of ingredients which are available to farmers and from which a farmer can select a specific set of ingredients for the preparation of animal feed. The main computer is programmed to store the ingredients in a look-up table cross-referenced with standard mixing periods to which the respective ingredients should be subjected during the mixing regime to produce an animal feed. Additionally, the look-up table contains mixing factors by which the standard mixing periods may be altered in order to take account of non-standard conditions, such as variations of the ingredients, the proportion of the particular ingredient, the average size or weight of the animals and the mixing apparatus and condition thereof in which the animal feed is to be mixed. The computer is programmed to determine the mixing period to which each ingredient is to be subjected in the mixing apparatus based on the corresponding standard mixing periods and any mixing factors which should be taken into account. The computer is programmed to then produce a sequence in which the ingredients are to be loaded into the mixing apparatus and the instants at which the respective ingredients are to be loaded into the mixing apparatus, so that each ingredient is subjected to the appropriate mixing period for that ingredient during the mixing cycle of the mixing regime, in order to avoid over-mixing and under-mixing of ingredients.

20 Claims, 15 Drawing Sheets

| 1<br>Category of Ingredients | 2<br>Sub-category of Ingredients | 3<br>Standard Mixing Period Numbers of Revolutions | 4<br>Mixing Factor Ingredients(Weight(Kg) per Animal) | 5<br>Mixing factor (Animal Average Weight Kg) | 6<br>Mixing Factor (Apparatus) |
|---|---|---|---|---|---|
| Soft Fibre | Clamp Silage | 17 | | | |
| Soft Fibre | Baled Silage (Chopped) | 47 | 20 to 30 – 1.50 | | Type A 0.90 |
| Soft Fibre | Baled Silage (Unchopped) | 80 | 30.01 upwards – 1.70 | | Type B 0.95 |
| Soft Fibre | Fresh Grass | 16 | | | Type C 1.05 |
| Long Fibre | Grade One | 20 | | | |
| Long Fibre | Grade Two | 32 | 1.00 to 2.00 –1.50 | 0 to 100 – 2.00 | |
| Long Fibre | Grade Three | 64 | 2.01 to 3.00 –2.00 | 101 to 300 – 1.66 | |
| Long Fibre | Grade Four | 96 | 3.01 upwards –3.00 | 301 to 500 –1.33 | |
| Long Fibre | Grade Five | 150 | | | |
| Long Fibre | Lucerne | 16 | | | |
| Root Crops | Unchopped | 100 | | | |

50

(56) References Cited

U.S. PATENT DOCUMENTS

| | | | |
|---|---|---|---|
| 8,608,368 B2* | 12/2013 | Bresciani et al. | 366/141 |
| 8,651,730 B2* | 2/2014 | Barbi | 366/141 |
| 2002/0101781 A1* | 8/2002 | Bump | 366/141 |
| 2011/0064865 A1* | 3/2011 | McCurdy et al. | 426/623 |
| 2011/0112688 A1* | 5/2011 | McCurdy et al. | 700/265 |
| 2011/0261641 A1* | 10/2011 | Barbi | 366/141 |
| 2011/0320033 A1* | 12/2011 | Bresciani et al. | 700/213 |
| 2012/0065759 A1* | 3/2012 | Kerr et al. | 700/103 |
| 2012/0287745 A1* | 11/2012 | Ghiraldi | 366/152.1 |

* cited by examiner

| 1 Ingredient | 2 Standard Mixing Period Number of Revolutions | 3 Mixing factor (Ingredient) | 4 Mixing factor (Ingredient Weight) | 5 Mixing factor (Animal Weight) | 6 Mixing factor (Mixing Apparatus) |
|---|---|---|---|---|---|
| A | NA | FA1 | FA2 | FA3 | FA4 |
| B | NB | FB1 | FB2 | FB3 | |
| C | NC | | | FC3 | FC4 |
| D | ND | FD1 | | | |
| E | NE | | | | FE4 |
| F | NF | | | FF3 | |
| G | NG | FG1 | | | |
| H | NH | | FH2 | FH3 | |
| I | NI | | | | FI4 |
| J | NJ | | FJ2 | | |
| K | NK | | | FK3 | FK4 |
| L | NL | | | | FL4 |

| Ingredient | Weight Per Animal |
|---|---|
| A | WA |
| C | WC |
| D | WD |
| F | WF |
| G | WG |
| H | WH |
| Number of Animals | N |
| Average weight of Animals | X |

Fig. 3

| 1 | 2 | 3 | 4 |
|---|---|---|---|
| Ingredient | Weight Per Animal | Mixing Period | Loading sequence Revolution No. |
| A | WA | NAXFA1 | 0 |
| D | WD | ND | 10 |
| H | WH | NHXFH3 | 15 |
| F | WF | NF | 40 |
| C | WC | NCXFC4 | 60 |
| G | WG | NG | 70 |

Total Number of revolutions of the mixing cycle of the mixing regime

Fig. 4

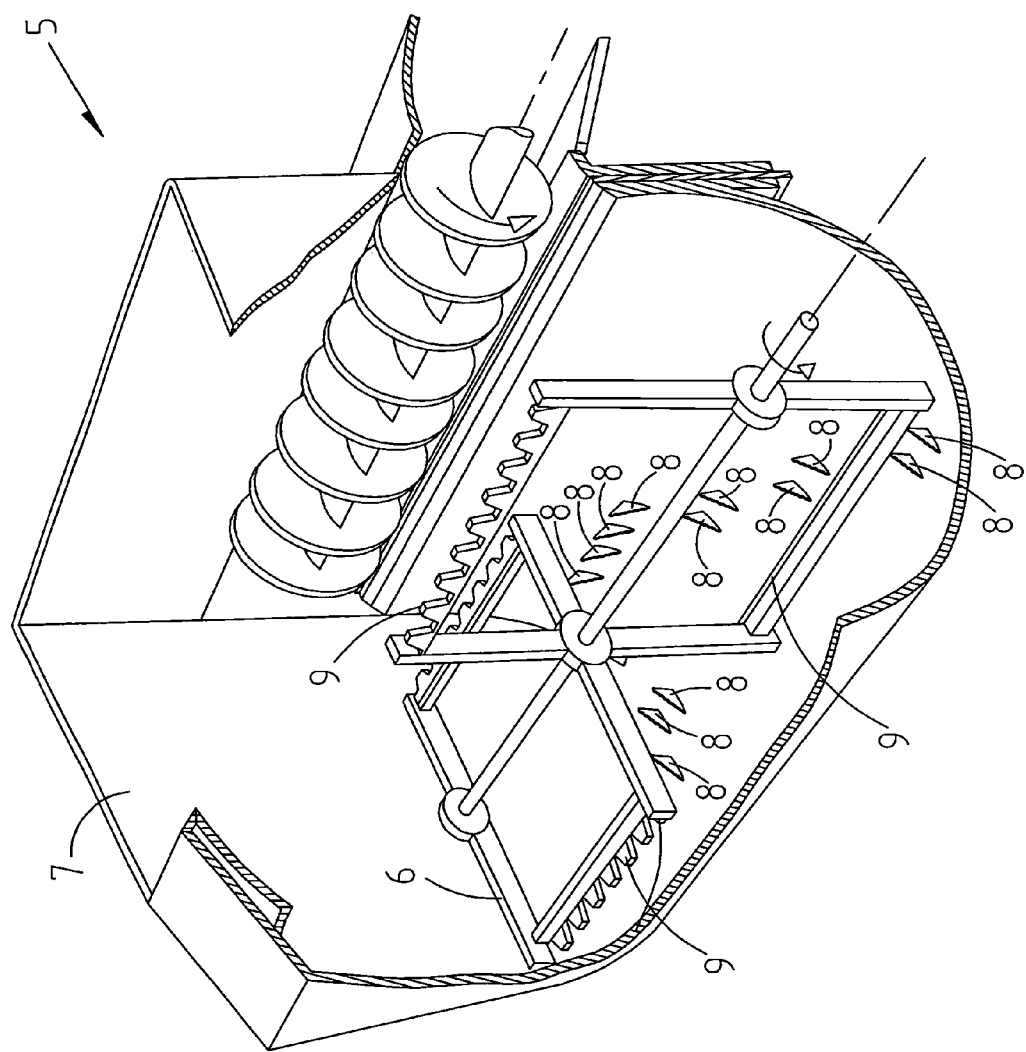

| 1 Category of Ingredients | 2 Sub-category of Ingredients | 3 Standard Mixing Period Numbers of Revolutions | 4 Mixing Factor Ingredients(Weight(Kg) per Animal) | 5 Mixing factor (Animal Average Weight Kg) | 6 Mixing Factor (Apparatus) |
|---|---|---|---|---|---|
| Soft Fibre | Clamp Silage | 17 | | | Type A 0.90 |
| Soft Fibre | Baled Silage (Chopped) | 47 | 20 to 30 – 1.50 | | Type B 0.95 |
| Soft Fibre | Baled Silage (Unchopped) | 80 | 30.01 upwards – 1.70 | | |
| Soft Fibre | Fresh Grass | 16 | | | Type C 1.05 |
| Long Fibre | Grade One | 20 | | 0 to 100 – 2.00 | |
| Long Fibre | Grade Two | 32 | 1.00 to 2.00 –1.50 | 101 to 300 – 1.66 | |
| Long Fibre | Grade Three | 64 | 2.01 to 3.00 –2.00 | 301 to 500 –1.33 | |
| Long Fibre | Grade Four | 96 | 3.01 upwards –3.00 | | |
| Long Fibre | Grade Five | 150 | | | |
| Long Fibre | Lucerne | 16 | | | |
| Root Crops | Unchopped | 100 | | | |

| Ingredients | Quantity per Animal (Kg) |
|---|---|
| Blend | 5.5 |
| Soyarape | 1.2 |
| Mineral Additive | 0.7 |
| Wheat | 2.5 |
| Molasses | 1.0 |
| Straw | 1.2 |
| Silage | 18 |
| Silage | 13 |

Number of Animals   100

Average Weight of Animals   550Kgs

Fig. 10

| Ingredients | Quantity per Animal (Kg) | Category of Ingredient | sub category of Ingredient |
|---|---|---|---|
| Blend | 5.5 | Concentrate | - |
| Soyarape | 1.2 | Concentrate | - |
| Mineral Additive | 0.7 | Mineral Additive | - |
| Wheat | 2.5 | Moist Feed | - |
| Molasses | 1.0 | Liquids | - |
| Straw | 1.2 | Long Fibre | Grade 4 |
| Silage | 18 | Soft Fibre | clamped |
| Silage | 13 | Soft Fibre | Baled Chopped |

Fig. 11

| Ingredients | Quantity per Animal (Kg) | Mixing Period Number of Revolutions Required | Loading Instant Revolution No. |
|---|---|---|---|
| Molasses | 1.0 | - | 0 |
| Straw | 1.2 | 136 | 20 |
| Mineral Additive | 0.7 | - | 30 |
| Soyarape | 1.2 | - | 40 |
| Blend | 5.5 | - | 50 |
| Straw (Remaining) | - | - | 60 |
| Wheat | 2.5 | - | 100 |
| Silage Baled | 13 | 45 | 111 |
| Silage Clamped | 18 | 16 | 140 |
| End | | | 156 |

Fig. 12

| 1 Category of Ingredients | 2 Sub-category of Ingredients | 3 Standard Mixing Period Number of Revolutions | 4 Mixing Factor Ingredients (weight (Kg) per Animal) | 5 Mixing Factor (Annual Average weight Kg) | 6 Mixing Factor (Apparatus) |
|---|---|---|---|---|---|
| Soft Fibre | Clamp Silage | Mx 17 | | | Type A 0.90 |
| Soft Fibre | Baled Silage (Chopped) | Mn 47 | 20 to 30 – 1.50 | | Type B 0.95 |
| Soft Fibre | Baled Silage (Unchopped) | Mn 80 | 30.01 upwards – 1.70 | | Type C 1.05 |
| Soft Fibre | Fresh Grass | Mx 16 | | 0 to 100 – 2.00 | |
| Long Fibre | Grade One | Mx 20 | 1.00 to 2.00 – 1.50 | 101 to 300 – 1.66 | |
| Long Fibre | Grade Two | Mn 32 | 2.01 to 300 – 2.00 | 301 to 500 – 1.33 | |
| Long Fibre | Grade Three | Mn 64 | 3.01 upwards – 3.00 | | |
| Long Fibre | Grade Four | Mn 96 | | | |
| Long Fibre | Grade Five | Mn 150 | | | |
| Long Fibre | Lucerne | Mn 16 | | | |
| Root Crops | Unchopped | Mn 100 | | | |

| Ingredients | Quantity per Animal (Kg) | Mixing Period Number of Revolutions Required | Loading Instant Revolution No. |
|---|---|---|---|
| Molasses | 1.0 | – | 0 |
| Straw | 1.2 | 136 | 20 |
| Mineral Additive | 0.7 | – | 30 |
| Soyarape | 1.2 | – | 40 |
| Blend | 5.5 | – | 50 |
| Straw (Remaining) | – | – | 60 |
| Wheat | 2.5 | – | 100 |
| Silage Baled | 13.0 | 45 | 111 |
| Silage Clamped | 18.0 | 16 | 140 |
| End | | | 156 |

Fig. 14

| 1 | 2 | 3 |
|---|---|---|
| Order | Feed Sub Category | Feed Category |
| 1 | Front Load Pre-mix | Concentrates |
| 2 | Liquids | Liquids |
| 2 | Molasses | Liquids |
| 3 | Water | Water |
| 4 | Post Load Pre-mix | Concentrates |
| 5 | Unchopped | Root Crops |
| 5 | Baled 1 | Soft Fibre |
| 5 | Baled 2 | Soft Fibre |
| 5 | Baled 3 | Soft Fibre |
| 5 | Baled 4 | Soft Fibre |
| 5 | Baled, Chopped (not in use) | Soft Fibre |
| 5 | Baled, Unchopped (not in use) | Soft Fibre |
| 6 | Five | Additional Long Fibre |
| 6 | Four | Additional Long Fibre |
| 6 | Three | Additional Long Fibre |
| 6 | Two | Additional Long Fibre |
| 7 | Lucerne | Additional Long Fibre |
| 8 | Concentrates | Concentrates |
| 8 | Pre-mix | Concentrates |
| 8 | Minerals/Additives | Minerals/Additives |
| 9 | One | Additional Long Fibre |
| 9 | Open | Moist Feed |
| 9 | Chopped | Root Crops |
| 10 | Clamped | Soft Fibre |
| 11 | Clamped, Starch | Soft Fibre |
| 12 | Zero | Additional Long Fibre |
| 12 | Stodgy | Moist Feed |
| 12 | Clamp Max | Soft Fibre |
| 12 | Fresh Grass | Soft Fibre |

Fig. 15

METHOD AND APPARATUS FOR DETERMINING A MIXING REGIME FOR USE IN THE PREPARATION OF ANIMAL FEED FROM A SET OF INGREDIENTS, AND A SYSTEM FOR PRODUCING THE ANIMAL FEED

BACKGROUND OF THE INVENTION

The present invention relates to a method and apparatus for determining a mixing regime for use in the preparation of animal feed from a set of ingredients, and the invention also relates to a system for use in the preparation of the animal feed.

Mixer/feeder apparatus, and in particular, mixer/feeder wagons for preparing a batch of animal feed from ingredients are well known. Such mixer/feeder wagons may be of the type commonly referred to as paddle mixer/feeder wagons, auger type mixer/feeder wagons and tub type mixer/feeder wagons. A paddle type mixer/feeder wagon is disclosed in PCT Published Application Specification No. WO 96/32836 of the present applicant and British Patent Specification No. 2,139,911. Typically, such mixer/feeder wagons comprise a mixing compartment in which the ingredients are homogenously mixed, and a dispensing compartment from which the mixed ingredients are dispensed. A mixing rotor, which typically is a paddle mixer, is rotatably located in the mixing compartment for mixing the ingredients of the animal feed therein. The mixer/feeder wagon disclosed in PCT published Application Specification No. WO 96/32836 comprises chopping blades located in the lower portion of the mixing compartment which co-operate with mixing paddles of the mixing rotor as the mixing rotor rotates for chopping ingredients which require chopping, and in particular for chopping fibrous ingredients into desirable lengths.

Auger type mixer/feeder wagons are disclosed in U.S. Pat. Nos. 4,951,883 and 5,622,323. Such auger type mixer/feeder wagons comprise a mixing compartment within which one or more longitudinally extending mixing augers are located. The mixing augers urge the animal feed in forward and rearward directions within the mixing compartment in order to mix the animal feed therein.

Tub type mixer/feeder wagons, in general, comprise a single vertically oriented mixing auger located in a mixing compartment which urges the animal feed upwardly through the mixing compartment, which then falls downwardly, to be urged upwardly again by the vertically oriented mixing auger, and so the mixing of the animal feed continues.

Typically, the animal feed comprises fibrous ingredients, such as, for example, long or short cut silage, hay, straw, maize, maize silage, wheat, oats, soda grain and/or sugar beet. Other ingredients of such animal feeds include additives and concentrates, for example, mineral additives and concentrates, energy additives and concentrates and liquids.

It has been found that the selection of the types of ingredients of a batch of animal feed, and in particular, the selection of the proportions of the ingredients which make up the animal feed is important in order to obtain optimum yields, such as milk output or weight gain from animals fed with the animal feed. It has also been found that the duration of a mixing cycle to which animal feed is subjected in a mixer/feeder wagon or other mixer/feeder apparatus is also important in producing an animal feed to produce optimum yields from animals fed with the animal feed. In particular, it is important to avoid both over-mixing and under-mixing of animal feed. Under-mixing results in the ingredients not being homogenously mixed, and thus, animals can subsequently pick and choose the more tasty ingredients of the animal feed, thus leaving the less tasty ingredients behind. Over-mixing can result in deterioration of the nutritional value of the animal feed, and in particular can result in deterioration of the fibrous material, and its properties of stimulating digestion of the nutrients in the animal feed in the animal's stomach. This is particularly so in the case of ruminants, such as beef cattle and milking and dry cows. In mixer/feeder wagons which include a chopping facility, such as the mixer/feeder wagon disclosed in PCT published Application Specification No. WO 96/32836, whereby the ingredients of the animal feed are simultaneously subjected to chopping and mixing, over-mixing of ingredients and in particular over-mixing of the fibrous ingredients can also lead to over-chopping of such ingredients. Over-chopping of the fibrous ingredients can result in the fibrous ingredients in the mixed animal feed being of lengths which are too short to stimulate optimum digestion of the nutrients in the animal's stomach. Over-mixing can also result in deterioration of the fibrous ingredients to the extent that the property of the fibrous material to enhance the digestive function of the stomach is lost. Under-mixing of fibrous material in such mixer/feeder wagons which also simultaneously chop the ingredients as well as producing an animal feed which is inadequately mixed also results in some of the fibrous material of the animal feed being of excessive lengths and sizes.

Accordingly, it is important that a mixing regime to which ingredients of an animal feed is subjected should be such as to avoid over-mixing of the ingredients and also under-mixing of the ingredients.

The present invention is directed towards a method and apparatus for determining a mixing regime for use in the preparation of animal feed from a set of ingredients which addresses the problem of over-mixing and under-mixing of ingredients of an animal feed. The invention is also directed towards a system for producing an animal feed which addresses the problem of over-mixing and under-mixing of ingredients.

SUMMARY OF THE INVENTION

According to the invention there is provided a method for determining a mixing regime under which ingredients of a set of ingredients are to be mixed in the preparation of animal feed, the method comprising:
  reading the ingredients from the set of ingredients,
  obtaining standard mixing periods for at least some of the respective ingredients of the set thereof from a master table comprising a list of ingredients or categories of ingredients suitable for use in the preparation of animal feeds cross-referenced with corresponding standard mixing periods,
  identifying any non-standard conditions identifiable from the read set of ingredients,
  in response to a non-standard condition being identified, obtaining a mixing factor from mixing factors cross-referenced with at least some of the ingredients or categories of ingredients in the master table, for altering the standard mixing period obtained for a corresponding one of the ingredients of the set of ingredients to compensate for the identified non-standard condition,
  determining the mixing periods to which the at least some of the ingredients of the set thereof are to be subjected during a mixing cycle of the mixing regime as a function of the corresponding standard mixing periods and any corresponding identified mixing factors, and producing a loading sequence of the mixing regime in which the ingredients of the set of ingredients are to be loaded into mixing apparatus during the mixing cycle for mixing thereof to produce the animal feed, so that the ingredients for which mixing periods are determined are subjected to mixing for the corresponding determined mixing periods during mixing of the set of ingredients under the mixing regime.

Preferably, the instants during the mixing cycle of the mixing regime at which the ingredients should be loaded into the mixing apparatus are defined in the mixing regime.

In one embodiment of the invention the proportion of each ingredient of the set of ingredients to produce the animal feed per animal is read.

Preferably, the master table comprises the mixing factors cross-referenced with the corresponding ingredients or categories of ingredients. Advantageously, the master table is stored in a computer readable medium.

In one embodiment of the invention each mixing factor is provided as a multiplier by which the standard mixing period of the corresponding ingredient or category of ingredients in the master table is to be multiplied in order to alter the standard mixing period for that ingredient or category of ingredients to compensate for the identified non-standard condition.

In another embodiment of the invention the mixing factors are numbers which may be equal to, greater than or less than one.

In a further embodiment of the invention the mixing factors may be integers.

In a still further embodiment of the invention the mixing factors may be fractions.

In one embodiment of the invention one of the non-standard conditions may relate to a characteristic of one of the ingredients of the set of ingredients.

In another embodiment of the invention one of the non-standard conditions may relate to a proportion of the set of ingredients constituted by one ingredient of the set of ingredients.

In a further embodiment of the invention one of the non-standard conditions may relate to a characteristic of the set of ingredients.

In a still further embodiment of the invention one of the non-standard conditions may relate to a characteristic of an animal to which the animal feed is to be fed.

In another embodiment of the invention one of the non-standard conditions may relate to the size of the animal to which the animal feed is to be fed.

In a further embodiment of the invention one of the non-standard conditions may relate to the mixing apparatus in which the ingredients of the set of ingredients are to be mixed to produce the animal feed. In a still further embodiment of the invention one of the non-standard conditions may relate to one of the type and the model of the mixing apparatus.

In one embodiment of the invention the method is adapted for determining the mixing regime for use in the mixing of the set of ingredients in a mixing apparatus which comprises a chopping function.

Preferably, the method is adapted for determining the mixing regime for use in the mixing of the set of ingredients in a mixing apparatus in which the chopping function is carried out simultaneously with mixing of the ingredients in the mixing apparatus.

In one embodiment of the invention the method is adapted for determining the mixing regime for use in the mixing of the set of ingredients in a mixing apparatus which comprises a paddle type mixing apparatus.

In a further embodiment of the invention the method is adapted for determining the mixing regime for use in mixing of the set of ingredients in mixing apparatus comprising a mixing rotor rotatably mounted in a mixing chamber.

In another embodiment of the invention the method is adapted for determining the mixing regime for use in the mixing of the set of ingredients in a mixing apparatus in which the mixing rotor is provided with a plurality of mixing paddles spaced apart circumferentially around the mixing rotor. Preferably, the method is adapted for determining the mixing regime for use in the mixing of the set of ingredients in a mixing apparatus in which the mixing paddles extend in a generally longitudinal direction relative to the rotational axis of the mixing rotor. Advantageously, the method is adapted for determining the mixing regime for use in the mixing of the set of ingredients in a mixing apparatus in which the mixing paddles of the mixing apparatus co-operate with chopping blades located in the mixing chamber for chopping the ingredients as the mixing rotor rotates.

Preferably, each standard mixing period is defined as a function of a number of revolutions of the mixing rotor of the mixing apparatus. Advantageously, each standard mixing period is defined as a number of revolutions of the mixing rotor of the mixing apparatus. Ideally, the mixing regime defines the instants at which the respective ingredients of the set of ingredients are to be loaded into the mixing apparatus as the numbers of revolutions of the mixing rotor which have elapsed from the commencement of the mixing cycle of the mixing regime at which the respective ingredients are to be loaded into the mixing apparatus.

In one embodiment of the invention the standard mixing periods are set based on the mixing periods required for the respective ingredients or the ingredients of the respective categories of ingredients in a predefined standard mixing apparatus operating at a standard full capacity. Preferably, the standard mixing periods are set to provide adequate mixing of the ingredients or the ingredients of the respective categories of ingredients in order to produce a substantially homogenously mixed animal feed. Advantageously, the standard mixing periods are set to provide adequate chopping of the ingredients or the ingredients of the respective categories of ingredients requiring chopping during mixing of the ingredients to provide an animal feed with the ingredients to be chopped chopped to a desired size.

Ideally, the standard mixing periods are set to avoid over-mixing of the ingredients.

Ideally, the standard mixing periods are set to avoid over-chopping of the ingredients.

Preferably, the standard mixing periods are set to avoid under-mixing of the ingredients.

In another embodiment of the invention the standard mixing periods may be provided as maximum standard mixing periods.

In another embodiment of the invention the standard mixing periods may be provided as minimum standard mixing periods.

In a still further embodiment of the invention the standard mixing periods may be provided as one of maximum standard mixing periods and minimum standard mixing periods.

In one embodiment of the invention at least some of the ingredients may be provided with maximum standard mixing periods and minimum standard mixing periods.

In another embodiment of the invention the number of animals to be fed with the animal feed is also read. Preferably, the amount of each ingredient to be mixed under the mixing regime is computed based on the amount of the corresponding ingredient per animal multiplied by the number of animals to which the animal feed is to be fed.

The invention also provides apparatus for carrying out the method according to the invention for determining a mixing regime under which ingredients of a set of ingredients are to be mixed in the preparation of animal feed.

Additionally the invention provides a computer implemented method for determining a mixing regime under which ingredients of a set of ingredients are to be mixed in the preparation of animal feed, the computer implemented method comprising:

reading the ingredients from the set of ingredients into a computer, obtaining standard mixing periods for at least some of the respective ingredients of the set thereof from a master table comprising a list of ingredients or categories of ingredients suitable for use in the preparation of animal feeds cross-referenced with corresponding standard mixing periods stored in a computer readable medium, identifying any non-standard conditions identifiable from the read set of ingredients, in response to a non-standard condition being identified, obtaining a mixing factor from mixing factors cross-referenced with at least some of the ingredients or categories of ingredients in the master table, for altering the standard mixing period obtained for a corresponding one of the ingredients of the set of ingredients to compensate for the identified non-standard condition, determining the mixing periods to which the at least some of the ingredients of the set thereof are to be subjected during a mixing cycle of the mixing regime as a function of the corresponding standard mixing periods and any corresponding mixing factors, and producing a loading sequence of the mixing regime in which the ingredients of the set of ingredients are to be loaded into mixing apparatus during the mixing cycle for mixing thereof to produce the animal feed, so that the ingredients for which mixing periods are determined are subjected to mixing for the corresponding determined mixing periods during mixing of the set of ingredients under the mixing regime.

Preferably, the instants during the mixing cycle of the mixing regime at which the ingredients should be loaded into the mixing apparatus are defined in the mixing regime.

In another embodiment of the invention the proportion of each ingredient of the set of ingredients to produce the animal feed per animal is read.

Preferably, the master table comprises the mixing factors cross-referenced with the corresponding ingredients or categories of ingredients. Advantageously, the master table is stored in a computer which is configured to implement the method.

Further the invention provides apparatus for determining a mixing regime under which ingredients of a set of ingredients are to be mixed in the preparation of animal feed, the apparatus comprising a main computer configured to store a master table comprising a list of ingredients or categories of ingredients suitable for use in the preparation of animal feeds cross-referenced with corresponding standard mixing periods, to store at least one mixing factor for at least some of the ingredients or categories of ingredients of the master table cross-referenced with the corresponding ingredient or category of ingredient, each mixing factor being adapted to be applied to the standard mixing period of the corresponding ingredient or category of ingredient for altering the standard mixing period thereof in response to a non-standard condition being identified in a set of ingredients for which a mixing regime is to be determined, to read the ingredients from the set of ingredients, to obtain standard mixing periods for at least some of the ingredients of the set of ingredients from the master table, to identify any non-standard conditions identifiable from the set of ingredients, to obtain a mixing factor from the stored mixing factors for one of the ingredients to compensate for an identified non-standard condition, in response to an identified non-standard condition, to determine the mixing periods for at least some of the ingredients of the set of ingredients to which those ingredients are to be subjected during a mixing cycle of the mixing regime as a function of the corresponding standard mixing periods and any corresponding mixing factors, and to produce a loading sequence of the mixing regime in which the ingredients of the set of ingredients are to be loaded into the mixing apparatus during the mixing cycle for mixing thereof to produce the animal feed, so that the ingredients for which mixing periods are determined are subjected to mixing for the respective corresponding determined mixing, periods during mixing of the set of ingredients under the mixing regime.

In one embodiment of the invention the main computer is configured to determine the instants during the mixing cycle of the mixing regime at which the ingredients should be loaded into the mixing apparatus during the mixing cycle.

In another embodiment of the invention the main computer is configured to read the proportion of each ingredient of the set of ingredients to produce the animal feed per animal is read.

Preferably, the main computer is configured to determine the mixing regime for use in the mixing of the set of ingredients in a mixing apparatus which comprises a chopping function.

Advantageously, the main computer is configured to determine the mixing regime for use in the mixing of the set of ingredients in a mixing apparatus in which the chopping function is carried out simultaneously with mixing of the ingredients in the mixing apparatus.

In one embodiment of the invention the main computer is configured to determine the mixing regime for use in the mixing of the set of ingredients in a mixing apparatus which comprises a paddle type mixing apparatus.

In another embodiment of the invention the main computer is configured to determine the mixing regime for use in mixing of the set of ingredients in mixing apparatus comprising a mixing rotor rotatably mounted in a mixing chamber.

In a still further embodiment of the invention the main computer is configured to determine the mixing regime for use in the mixing of the set of ingredients in a mixing apparatus in which the mixing rotor is provided with a plurality of mixing paddles spaced apart circumferentially around the mixing rotor.

In another embodiment of the invention the main computer is configured to determine the mixing regime for use in the mixing of the set of ingredients in a mixing apparatus in which the paddles extend in a generally longitudinal direction relative to the rotational axis of the mixing rotor.

In a further embodiment of the invention the main computer is configured to determine the mixing regime for use in the mixing of the set of ingredients in a mixing apparatus in which the mixing paddles of the mixing apparatus co-operate with chopping blades located in the mixing chamber for chopping the ingredients as the mixing rotor rotates.

Preferably, the main computer is configured to define the instants at which the respective ingredients of the set of ingredients are to be loaded into the mixing apparatus as the numbers of revolutions of the mixing rotor which have elapsed from the commencement of the mixing cycle of the mixing regime at which the respective ingredients are to be loaded into the mixing apparatus. Advantageously, the standard mixing periods are set based on the mixing periods required for the respective ingredients in a predefined standard mixing apparatus operating at a standard full capacity. Preferably, the standard mixing periods are set to provide adequate mixing of the ingredients in order to produce a substantially homogenously mixed animal feed.

In one embodiment of the invention the standard mixing periods are set to provide adequate chopping of the ingredients requiring chopping during mixing of the ingredients to provide an animal feed with the ingredients to be chopped chopped to a desired size.

In one embodiment of the invention the main computer is configured to read the number of animals to be fed with the animal feed is also read.

In another embodiment of the invention the main computer is configured to compute the amount of each ingredient to be mixed under the mixing regime based on the amount of the corresponding ingredient per animal multiplied by the number of animals to which the animal feed is to be fed.

The invention also provides a system for determining a mixing regime for use in the preparation of animal feed from a set of ingredients, the system comprising the apparatus according to the invention, and a first secondary computer, the first secondary computer being configured to be communicable with the main computer, and to facilitate inputting of the ingredients of the set of ingredients so that the main computer can read the inputted ingredients of the set of ingredients from the first secondary computer.

In one embodiment of the invention the main computer is configured to relay the determined mixing regime to the first secondary computer.

Preferably, the system comprises mixing apparatus in which the ingredients are to be mixed.

Advantageously, a second secondary computer is provided associated with the mixing apparatus for indicating the loading sequence of the determined mixing regime under which the ingredients of the set of ingredients are to be loaded into the mixing apparatus during the mixing cycle of the mixing regime.

Advantageously, a transfer means is provided for transferring the determined mixing regime to the second secondary computer.

Preferably, the transfer means is adapted for transferring the determined mixing regime from the first secondary computer to the second secondary computer.

Advantageously, the second secondary computer comprises an input means for facilitating inputting of the number of animals to be fed with the animal feed.

In one embodiment of the invention the second secondary computer is configured to compute the amount of each ingredient of the animal feed to be mixed from the inputted number of animals to be fed and the amount of the corresponding ingredient per animal.

In another embodiment of the invention a weighing means is provided on the mixing apparatus for weighing the ingredients as the ingredients are being loaded into the mixing apparatus.

In another embodiment of the invention the mixing apparatus comprises a mixing rotor for mixing the ingredients therein, and a monitoring means is provided for monitoring the number of revolutions of the mixing rotor.

In a further embodiment of the invention the second secondary computer is communicable with the weighing means and the monitoring means and is configured to read the current weight of ingredients in the mixing apparatus, and for reading the current number of revolutions of the mixing rotor to which the ingredients in the mixing apparatus have been subjected.

Preferably, the second secondary computer comprises a display screen for sequentially displaying the identity of the ingredients to be loaded into the mixing apparatus.

Advantageously, the second secondary computer is configured to display the weight of each ingredient to be loaded into the mixing apparatus is displayed on the display screen.

Ideally, the second secondary computer is configured to operate the visual display means to display the particulars of the next ingredient to be loaded into the mixing apparatus and the weight thereof.

In one embodiment of the invention the second secondary computer is configured to operate the display means to display the outstanding weight of the ingredient currently being loaded into the mixing apparatus which is still to be loaded into the mixing apparatus.

Advantageously, the second secondary computer is configured to output a first alert signal indicative of the majority of the ingredient currently being loaded into the mixing apparatus having been loaded therein.

In another embodiment of the invention the second secondary computer is configured to output a second alert signal indicative of the total amount of each ingredient having been loaded into the mixing apparatus.

Ideally, the second secondary computer is configured to indicate the instant at which each ingredient is to be loaded into the mixing apparatus during the mixing cycle of the mixing regime.

In one embodiment of the invention the second secondary computer is configured to store the quantity of each ingredient which has been loaded into the mixing apparatus.

In another embodiment of the invention the second secondary computer is configured to store the mixing period to which each of the ingredients of the set of ingredients is subjected during mixing of the animal feed.

In a further embodiment of the invention the transfer means is adapted for transferring the stored quantity of the ingredients mixed in the mixing apparatus and the stored mixing periods to which each of the ingredients was subjected during mixing thereof from the second secondary computer to the first secondary computer.

In a still further embodiment of the invention the first secondary computer is configured to relay the stored quantity of ingredients loaded into the mixing apparatus and the stored mixing periods to which the respective ingredients were subjected to the main computer for analysis thereof.

In another embodiment of the invention the first secondary computer is configured to facilitate inputting of data relating to the yield achieved from the animals fed with the animal feed mixed in the mixing apparatus under the mixing regime.

In another embodiment of the invention the first secondary computer is configured to relay the yield data to the main computer for analysis with the stored data relayed by the first secondary computer from the second secondary computer to the main computer.

The invention also provides a computer programme encoding a set of computer instructions for determining a mixing regime under which ingredients of a set of ingredients are to be mixed in the preparation of animal feed, which when running on a computer is adapted to perform the methods according to the invention.

Further the invention provides a computer programme stored on a computer readable storage medium having encoded thereon data and computer instructions for determining a mixing regime under which ingredients of a set of ingredients are to be mixed in the preparation of animal feed, for causing a computer to implement the method according to the invention.

The invention also provides a computer provided with or running a computer programme encoding a method for determining a mixing regime under which ingredients of a set of ingredients are to be mixed in the preparation of animal feed according to the invention.

The advantages of the invention are many. A particularly important advantage of the invention is that the mixing regime which is determined by the method and apparatus is such as to avoid over-mixing and under-mixing of the ingredients. Additionally, by avoiding over-mixing, over-chopping of the ingredients is avoided, and similarly, by avoiding under-mixing, under-chopping of the ingredients is also avoided. In particular, in accordance with the method and apparatus according to the invention, the ingredients are loaded into mixing apparatus in a sequence which provides that the ingredients which are to be subjected to respective mixing periods are subjected to mixing in the mixing apparatus for such mixing periods which are the optimum mixing periods for those ingredients. By basing the mixing period on the number of revolutions of the mixing rotor of the mixing apparatus to which those ingredients which are to be subjected to a mixing period during mixing are subjected, a particular advantage is achieved, in that the relevant ingredients are subjected to the desired number of revolutions of the mixing rotor to which those ingredients should be subjected in order to achieve optimum mixing of the ingredients with the other ingredients, and where relevant, to ensure that the ingredients are subjected to chopping for the appropriate number of revolutions of the mixing rotor.

By providing mixing factors which take into account non-standard conditions of the ingredient or ingredients, the proportion of a particular ingredient, such as a fibrous ingredients in the animal feed, the type and condition of the mixing apparatus, as well as the average weight of the animals to be fed with the animal feed, a particularly important advantage of the invention is achieved, in that the standard mixing periods can be readily altered to take account of any such non-standard conditions.

A further advantage of the method, system and apparatus according to the invention is that variations in animal feeds produced by the method, system and apparatus from similar ingredients are minimised. This, thus, enables animal feeds to be produced with optimal physical characteristics which maximises the digestive function of the animal fed with the animal feed, which in turn maximises conversion of the animal feed to milk yield or weight gain in the animals, as the case may be.

BRIEF DESCRIPTION OF THE DRAWINGS

The invention will be more clearly understood from the following description of a preferred embodiment thereof, which is given by way of example only, with reference to the accompanying drawings, in which:

FIG. 3 is a table setting out a set of ingredients of an animal feed for which a mixing regime is to be prepared, FIG. 4 is a table setting out a mixing regime for the ingredients of the animal feed in the table of FIG. 3, FIG. 8 is a cutaway perspective view of the mixing apparatus of FIG. 6, FIG. 9 illustrates a look-up table for use in a system according to another embodiment of the invention for producing a mixing regime under which a set of ingredients are to be mixed to produce animal feed, and also for producing the animal feed, FIG. 10 is a table setting out a set of ingredients of an animal feed for which a mixing regime is to be prepared, FIG. 11 is a table of the ingredients of the table of FIG. 10 produced by the system of FIG. 1 in an intermediate step carried out by the system, FIG. 12 is a table setting out a mixing regime for the ingredients of the animal feed of the table of FIG. 10, FIG. 13 illustrates a look-up table used in a system according to another embodiment of the invention for producing a mixing regime under which a set of ingredients are to be mixed to produce the animal feed, and also for producing the animal feed, FIG. 14 is a table setting out a mixing regime of the ingredients of the animal feed of the table of FIG. 13, and FIG. 15 is a table setting out a loading sequence of ingredients by category and sub-category of the ingredients from which a default sequence of a mixing regime is determined.

DETAILED DESCRIPTION OF THE INVENTION

Figure 1:
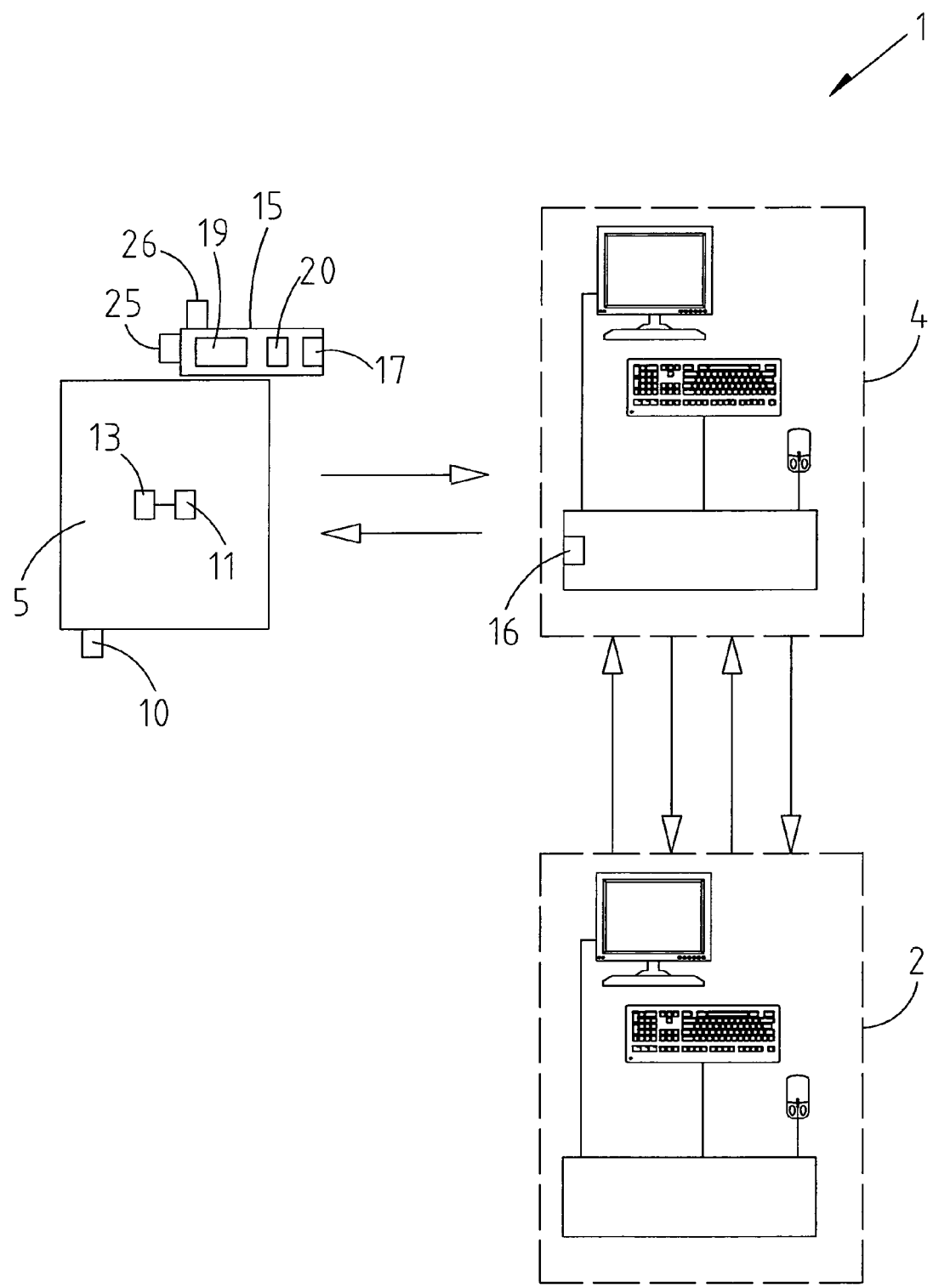
FIG. 1 is a schematic representation of a system according to the invention for producing a mixing regime under which a set of ingredients are to be mixed to produce animal feed, and also for producing the animal feed.

Referring to the drawings and initially to FIG. 1, there is illustrated a system according to the invention, indicated generally by the reference numeral 1, for determining a mixing regime for use in the preparation of a homogenously mixed animal feed from a set of ingredients, and for producing the homogenously mixed animal feed under the mixing regime. The system 1 comprises a main computer 2, which typically is located in a main station, and is communicable with a plurality of first secondary computers 4 which typically are personal computers (PCs) and are located on the premises of respective farmers. Only one of the first secondary computers 4 is illustrated in FIG. 1, however, the other first secondary computers are substantially similar to the first secondary computer 4. The respective first secondary computers 4 are all communicable with the main computer 2 via the internet.

In general, each farmer who has a first secondary computer 4 has a herd of dairy or milking cows, a herd of beef cattle, a herd of sheep and/or a herd of goats. Additionally, each farmer will have originally had the ingredients available to him from which animal feed is to be prepared for feeding the herd of animals analysed in order to determine the nutritional values of the various ingredients. Each farmer will also have had analysis carried out on the ingredients available to him in order to determine an optimum feed ration for the animals of the herd. The ingredients available to the farmers may vary throughout the year. Irrespective of which ingredients the farmer decides to select for a set of ingredients in order to produce an animal feed, the farmer will already have been advised based on the nutritional value of the various ingredients available to the farmer and other characteristics thereof of the appropriate proportions of the ingredients to be mixed in respect of different sets of ingredients to produce an animal feed for one animal of the herd.

The main computer 2 is programmed to determine the mixing regime as will be described in detail below to produce an animal feed from a set of ingredients which are available to the farmer. The farmer enters particulars of the ingredients of the set of ingredients, which are to be used to produce the animal feed, into the first secondary computer 4, which are read by the main computer 2, which in turn determines the mixing regime under which the ingredients are to be mixed, as will be described below. The mixing regime is then relayed by the main computer 2 to the first secondary computer 4.

Figure 6:
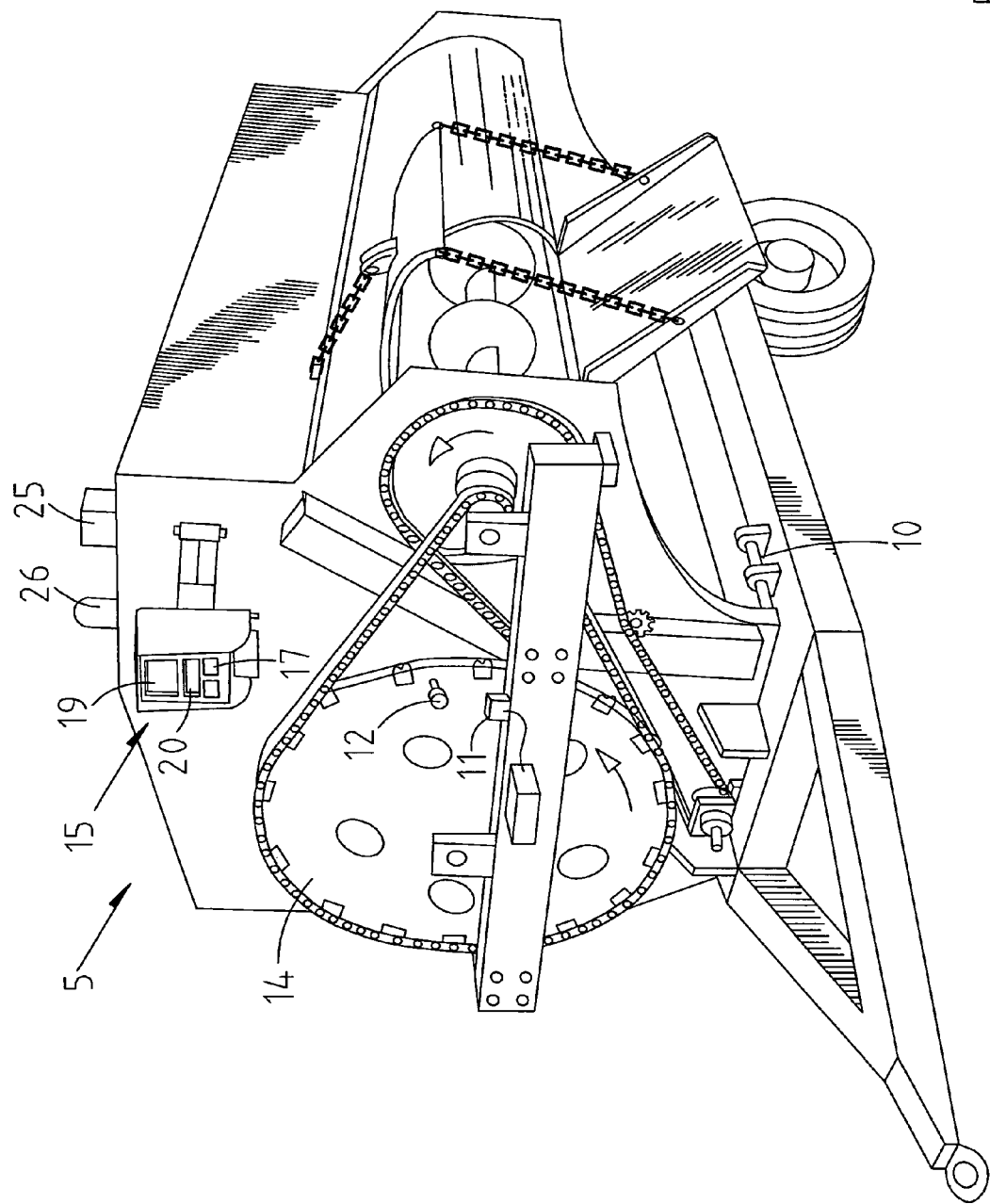
FIG. 6 is a perspective view of mixing apparatus for use with the system of FIG. 1.
Figure 7:
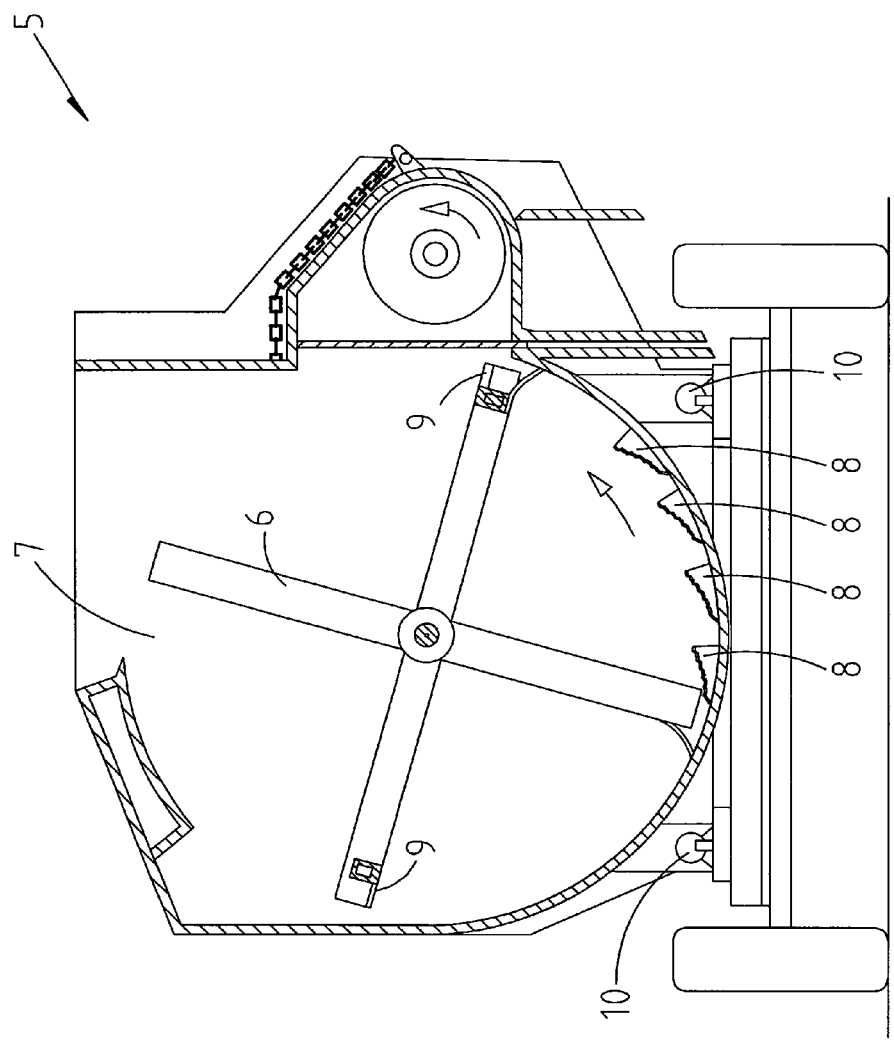
FIG. 7 is a transverse cross-sectional end elevational view of the mixing apparatus of FIG. 6.

Each farmer also has a mixing means for mixing the ingredients to produce the animal feed for the animals, and in this embodiment of the invention the mixing means of each farmer comprise mixing apparatus 5 which ideally is provided by a paddle type mixer/feeder wagon of the type disclosed in PCT Published Patent Application Specification No. WO 96/32836 of Salford Engineering Limited. The mixer/feeder wagon is described in detail in the PCT specification, and only those features of the mixer/feeder wagon which are relevant to the system 1 are described herein with reference to FIGS. 6 to 8.

As described in PCT Specification No. WO 96/32836 the mixer/feeder wagon comprises a paddle type mixing rotor 6 which is rotatably mounted in a mixing chamber or mixing compartment 7. Chopping blades 8 in the mixing compartment co-operate with mixing paddles 9 of the mixing rotor 6 for chopping the ingredients which need chopping during mixing of the ingredients in the mixing compartment 7 during a mixing cycle of the mixing regime. The mixing apparatus 5 includes a weighing means, namely, four load cells 10 for weighing the ingredients as the ingredients are being loaded into the mixing compartment 7 of the mixing apparatus 5. The mixing apparatus 5 also includes a monitoring means, namely, a proximity sensor 11 which co-operates with a bolt 12 on a sprocket 14 which directly drives the mixing rotor 6 for counting the number of revolutions of the mixing rotor 6 of the mixing apparatus 5 during a mixing cycle.

A second secondary computer, which in this embodiment of the invention comprises a minicomputer 15 is mounted on the mixing apparatus 5, and as will be described below, receives signals from the load cells 10 which are indicative of the current weight of the ingredient or ingredients in the mixing apparatus 5. Signals from the proximity sensor 11 which are indicative of the number of revolutions of the mixing rotor 6 to which the ingredient or ingredients in the mixing apparatus 5 have been subjected are fed to a counter 13 which produces a count of the number of revolutions of the mixing rotor 6. The minicomputer 15 reads the count of the number of revolutions of the mixing rotor 6 from the counter 13.

A transfer means, in this embodiment of the invention a memory stick (not shown) is provided for transferring data between the first secondary computer 4 and the minicomputer 15, so that when a mixing regime has been determined for the set of ingredients by the main computer 2 and is relayed to the first secondary computer 4, the data relating to the mixing regime is transferred via the memory stick from the first secondary computer 4 to the minicomputer 15. The first secondary computer 4 and the minicomputer 15 are provided with respective USB ports 16 and 17 for facilitating transfer of the data by the memory stick.

The minicomputer 15 comprises a visual display 19 which displays the ingredients to be loaded into the mixing apparatus 5 and the order in which the ingredients are to be loaded into the mixing apparatus 5 in accordance with the mixing regime. A keypad 20 is provided on the minicomputer 15 for facilitating inputting of data into the minicomputer 15 as will be described below. The minicomputer 15 is also programmed to display the weight of each ingredient to be loaded into the mixing apparatus 5, and counts down the weight of each ingredient as the ingredient is being loaded into the mixing apparatus 5 in response to the signals received from the load cells 10. The outstanding weight of the ingredient currently being loaded into the mixing apparatus 5 which has still to be loaded is displayed on the visual display 19. The minicomputer 15 monitors the signals from the load cells 19 and the counter 13 for determining the weight of the ingredient currently being loaded into the mixing apparatus 5, and the number of revolutions of the mixing rotor 6 to which the ingredients have been subjected in the mixing apparatus 5. The minicomputer 15 and its operation is described in more detail below.

Figure 2:
FIG. 2 illustrates a look-up table used in the system of FIG. 1.

Turning now in more detail to the main computer 2, a master list of ingredients or categories of ingredients suitable for use in the preparation of animal feeds, and which are available to a large number of farmers, who use the system 1 is stored in suitable memory in a look-up table 24 in the main computer 2, see FIG. 2. The ingredients or categories of ingredients which are available to the farmers and which are stored in the look-up table 24 will differ from farmer to farmer, and in particular, will differ from a farmer in one region to a farmer in another region. Accordingly, many of the ingredients or categories of ingredients stored in the look-up table 24 will not be relevant to some farmers, but will be relevant to other farmers.

The list of ingredients stored in the look-up table 24 may be actual ingredients or categories of ingredients. Where the ingredients are stored as categories of ingredients, the categories may be relatively broad categories. For example, one category may, for example, be a category for fibrous material where the fibrous material would be soft fibre, and this category could include a number of sub-categories, for example, silage, fresh grass, baled chopped silage and the like. Another category may, for example, be a long fibre category, which would include unchopped silage, lucerne, hay, straw and the like. These categories and sub-categories are described in detail below with reference to FIGS. 9 to 14. However, for ease of understanding the invention, the method will first be described with reference to the look-up table 24 of FIG. 2 in which the look-up table comprises a list of ingredients, rather than categories of ingredients.

The ingredients which are stored in the look-up table 24 are stored in column 1 thereof, and are identified as ingredients A, B, C, D up to ingredient L. Only seven ingredients A to L are described as being stored in the look-up table 24, however, in practice, it will be appreciated that the list of ingredients in the look-up table 24 will contain many more ingredients than seven, since it is envisaged that the system 1 will determine mixing regimes for a wide range of farmers in a wide range of jurisdictions, for example, farmers in Europe, the U.S., Australia, New Zealand, Africa and other jurisdictions, and the ingredients available to farmers throughout such a wide range of jurisdictions will differ significantly from jurisdiction to jurisdiction.

It has been found that the different ingredients of the look-up table 24 require to be subjected to mixing in the mixing apparatus 5 for different mixing periods. These mixing periods are referred to as standard mixing periods. The standard mixing periods may be time based or based on the number of revolutions of the mixing rotor 6 to which the ingredients are to be subjected during mixing thereof in the mixing apparatus 5 during a mixing cycle of a mixing regime to produce the animal feed. In this embodiment of the invention the standard mixing periods are based on the number of revolutions of the mixing rotor 6 to which the respective ingredients are to be subjected in the mixing apparatus 5. Accordingly, the standard mixing period defined by the number of revolutions of the mixing rotor 6 to which each ingredient is to be subjected in a mixing cycle of a mixing regime to produce the mixed animal feed is stored in column 2 of the look-up table 24, and cross-referenced with the corresponding ingredient in column 1. The number of revolutions of the mixing rotor 6 of the standard mixing periods are identified as NA to NL, the number NA being the number of revolutions of the mixing rotor 6 to which the ingredient A is to be subjected, and so on to NL, which is the number of revolutions of the mixing rotor to which ingredient L is to be subjected.

As mentioned above, the mixing apparatus 5 also includes a chopping function for chopping those ingredients of the animal feed which require chopping, for example, long fibre ingredients, such as long straw, hay or silage. Other ingredients which require chopping are sugar beet, maize silage, grass silage, hay, straw and the like. The chopping function is carried out by the co-operating action of the mixing paddles 9 of the mixing rotor 6 and the chopping blades 8 as the mixing rotor 6 rotates. Thus, the mixing periods for such ingredients as well as being determined by the requirement that the animal feed should comprise a homogenous mix of the ingredients is also determined by the dwell time in the mixing apparatus 5 required to chop the ingredients which require chopping to the appropriate size. Accordingly, the standard mixing periods set forth in column 2 of the look-up table 24 take account of the dwell time in the mixing apparatus 5 based on the number of revolutions of the mixing rotor 6 required by such ingredients. Additionally, the standard mixing periods are the mixing periods required by the respective ingredients of the master list of ingredients if they were mixed in a predefined standard mixing apparatus 5 of a predefined standard size operating at full capacity, and if the ingredients were of predefined characteristics, for example, of a specific moisture content, and in the case of silage, for example, the fibres of the silage would be of a predefined average length.

However, it has been found that under certain non-standard conditions, the standard mixing periods for some of the ingredients may have to be altered. For example, if an ingredient is tough, or in the case of straw is of relatively long fibre lengths, such ingredient may require a longer mixing period than the standard mixing period set forth in column 2 of the look-up table 24 in order to be adequately chopped. Additionally, in the case of long fibrous material which constitutes a relatively high proportion of the animal feed, a longer mixing period in the mixing apparatus will be required than the standard mixing period in order to achieve the appropriate chopped size of the ingredient. The mixing periods required for some of the ingredients will also vary depending on the actual type, model, size and age of mixing apparatus, as well as on the type and size of the animals to which the feed is to be fed, and would therefore be different to the standard mixing periods. Thus, to take account of these variations, mixing factors are also stored in the look-up table 24 cross-referenced with the corresponding ingredient A to L of the master list where such mixing factors are relevant.

The mixing factors are stored in the look-up table 24 in columns 3 to 6 and cross-referenced with the corresponding ones of the ingredients A to L. The mixing factors are provided as multipliers by which the standard mixing periods of the corresponding ingredient in column 1 are to be multiplied, and may be of value greater than one or less than one, and may be integer values or fractional values or combinations of both integer and fractional values. For example, where the non-standard condition is such that a mixing period for an ingredient greater than the corresponding standard mixing period for that ingredient is required, the corresponding mixing factor will be of value greater than one, and where the non-standard condition is such that the standard mixing period for that ingredient is to be reduced, the value of the mixing factor will be less than one and greater than zero.

Mixing factors which take account of non-standard conditions which relate to a characteristic of the ingredients are stored in column 3 of the look-up table 24 for some of the ingredients, and are cross-referenced with the corresponding ingredients in column 1. The mixing factors relevant to a characteristic of the ingredient for ingredient A is identified as the mixing factor FA1. Similarly, for ingredient B, the corresponding mixing factor is identified as FB1. Some of the ingredients will not require a mixing factor relevant to a characteristic of the particular ingredient, and in those cases such a mixing factor is omitted. Thus, as can be seen from column 3 of the look-up table 24, only ingredients A, B, D and G include a mixing factor relative to a characteristic of the ingredient.

Mixing factors for ingredients where the proportion of the ingredient in the animal feed exceeds a certain predefined proportion of the animal feed are provided in column 4 of the look-up table 14 and cross-referenced with the corresponding ingredient in column 1. The mixing factor relative to the proportion of the ingredient in the animal feed for ingredient A is identified by the mixing factor FA2. Not all ingredients will require a mixing factor relative to the proportion of the ingredient in the animal feed, and as can be seen, only ingredients A, B, H and J require such a mixing factor, and these mixing factors for the ingredients A, B, H and J are identified as the mixing factors FA2, FB2, FH2 and FJ2, respectively.

The other mixing factors required, which are relevant to the size or weight of the animal and the specific type of mixing apparatus 5 used in the mixing of the animal feed are included in columns 5 and 6, respectively, of the look-up table 24. The mixing factor for the ingredient A which is relevant to the size or weight of the animal in column 5 is identified as the mixing factor FA3, while the mixing factor for the ingredient A relevant to the mixing apparatus in column 6 is identified as the mixing factor FA4. Similar type mixing factors for others of the ingredients A to L which require such mixing factors are also provided in columns 5 and 6 and cross-referenced with the corresponding ingredients. In this case the ingredients A, B, C, F, H and K are provided with mixing factors which are relevant to the size or weight of the animal and are identified as mixing factors FA3, FB3, FC3, FF3, FH3 and FK3. The ingredients which require mixing factors which are relevant to the mixing apparatus are ingredients A, C, E, I, K and L, and these mixing factors are identified as mixing factors FA4, FC4, FE4, FI4, FK4 and FL4, respectively. In general, the smaller the animal, in other words, the lighter the animal is in weight, the smaller will be the muzzle of the animal, and accordingly, those ingredients requiring chopping, in particular, straw and other fibrous ingredients such as silage, will require to be chopped into smaller sizes and lengths than would be required for heavier larger animals. Thus the mixing factors FA3, FB3, FC3, FF3, FH3 and FK3 will, in general, be of value greater than one in order to increase the standard mixing periods of the relevant ingredients when the mixed animal feed is to be provided for animals with relatively small muzzles. The values of the mixing factors FA3 to FK3 may be integer value or improper fractions.

The main computer 2 refers to the look-up table 24 in order to determine a mixing regime for a set of ingredients of animal feed. As mentioned above, the farmer already knows the weight of each ingredient of a set of ingredients to make up an animal feed for one of the animals of the herd. The farmer thus on deciding the ingredients to be used in the animal feed inputs the set of ingredients and the weight thereof per animal to produce the animal feed for one animal into the first secondary computer 4, along with the number of animals in the herd to be fed as well as the average size of the animals in the herd. This data is shown in the table of FIG. 3, which illustrates a typical set of ingredients of animal feed. The set of ingredients and the weights thereof per animal, as well as the number and average weight of the animals in the herd, which is inputted to the first secondary computer 4 is transmitted via the internet to the main computer 2.

In this case the set of ingredients to make up the animal feed are ingredients A, C, D, F, G and H, and are set out in column 1 of the table of FIG. 3. The weights of the respective ingredients to make up an animal feed for one animal are set forth in column 2 of the table, and are represented by the weights WA, WC to WH, the weight WA being the weight of ingredient A and so on to the weight WH being the weight of ingredient H.

Data relating to any non-standard conditions of the ingredients of each farmer is stored in the main computer 2, as are particulars of the mixing apparatus of each farmer. The particulars relating to the mixing apparatus of each farmer includes the type, model size and age of the mixing apparatus. The particulars relating to non-standard conditions of the ingredients of each farmer relate to the conditions of such ingredients, for example, the moisture content of the ingredient, in the case of fibrous ingredients, the average fibre length, and other such relevant data relating to the ingredients.

On receipt of the set of ingredients from the first secondary computer 4, the main computer 2 reads from column 2 of the look-up table 24 of FIG. 2 the standard mixing periods for the ingredients A, C, D, F, G and H, namely, the standard mixing periods NA, NC, ND, NF, NG and NH, respectively. The main computer 2 reads from the stored particulars relating to the ingredients of that farmer and the mixing apparatus of that farmer any non-standard conditions which should be taken into account when computing the mixing periods for the ingredients A, C, D, F, G and H. On determining if such non-standard conditions exist, the main computer 2 obtains the appropriate mixing factors from columns 3 to 6 of the look-up table 24 of FIG. 2 corresponding to the relevant ones of the ingredients A, C, D, F, G and H.

In this case the mixing factors FA1, FH3 and FC4 are relevant and are selected from the look-up table 24 of FIG. 2. Accordingly, the main computer 2 in order to determine the mixing period for the ingredient A multiplies the standard mixing period NA by the mixing factor FA1. The mixing periods for the ingredients C and H are computed by multiplying the standard mixing period NC by the mixing factor FC4, and by multiplying the standard mixing period NH by the mixing factor FH3, respectively. The mixing periods for the ingredients D, F and G are the standard mixing periods ND, NF and NG.

Once the mixing periods have been determined for the respective ingredients of the set of ingredients, the main computer 2 then determines the loading sequence of the mixing regime under which the ingredients of the set of ingredients are to be loaded into the mixing apparatus 5 of the former. In other words, the main computer 2 determines the sequence in which the ingredients A, C, D, F, G and H are to be loaded into the mixing apparatus 5, so that each ingredient of the set of ingredients is subjected to the determined number of revolutions of the mixing rotor 6 during the mixing cycle of the determined mixing regime of the animal feed, and is not subjected to more or less than the determined number of revolutions of the mixing rotor 6. Thus, as well as determining the sequence, the main computer 2 also determines the instants in the mixing cycle at which the respective ingredients of the set of ingredients are to be loaded into the mixing apparatus 5. The determined mixing regime for the set of ingredients is set forth in the table of FIG. 4. This data is then transmitted via the internet from the main computer 2 to the secondary computer 4.

In the table of FIG. 4, the ingredients are listed in column 1 in the order in which they are to be loaded into the mixing apparatus 5, which is the sequence A, D, H, F, C and G. The weight of each ingredient per animal is set out in column 2 of the table of FIG. 4. The mixing period to which each ingredient is to be subjected is set out in column 3 of Table 4. The mixing periods in column 3 are defined as the number of revolutions of the mixing rotor 6 to which the ingredients are to be subjected. The mixing periods for ingredients D, F and G are the standard mixing periods, while the mixing periods for the ingredients A, H and C have been obtained by multiplying the standard mixing period by the appropriate mixing factors for the respective ingredients as described above. The instants during the mixing cycle in which the respective ingredients are to be loaded into the mixing apparatus 5 based on the number of revolutions of the mixing rotor 6 from the commencement of mixing of the animal feed is set forth in column 4 of the table of FIG. 4. The total number of revolutions of the mixing rotor to which the animal feed is to be subjected during the mixing cycle under the mixing regime is also set out in Table 4. In this case the total number of revolutions is 85 revolutions.

Ingredient A is to be loaded initially into the mixing apparatus 5. The mixing rotor 6 is activated to commence rotating on commencement of loading of ingredient A into the mixing apparatus 5. The mixing cycle commences on commencement of loading of ingredient A into the mixing apparatus. The mixing rotor 6 continues to rotate uninterrupted during the mixing cycle, and at revolution no. 10 of the mixing rotor 6 from the commencement of the mixing cycle, ingredient D is to be loaded into the mixing apparatus 5. At revolution no. 15 of the mixing rotor 6, ingredient H is to be loaded into the mixing apparatus 5. At revolution no. 40 of the mixing rotor 6, ingredient F is to be loaded into the mixing apparatus 5. At revolution no. 60 of the mixing rotor, ingredient C is to be loaded into the mixing apparatus 5, and at revolution no. 70 of the mixing rotor, ingredient G is to be loaded into the mixing apparatus 5. The mixing rotor 6 then continues to rotate for a further number of revolutions, namely, NG revolutions, which in this case is 15, thus bringing the total number of revolutions of the mixing rotor 6 to which ingredient A has been subjected to 85, the total number of revolutions of the mixing rotor 6 to which ingredient D has been subjected to 75, the total number of revolutions of the mixing rotor 6 to which ingredient H has been subjected to 60, the total number of revolutions of the mixing rotor 6 to which ingredient F has been subjected to 45, the total number of revolutions of the mixing rotor 6 to which ingredient C has been subjected to 25, and the total number of revolutions of the mixing rotor 6 to which ingredient G has been subjected to as 15. These numbers of revolutions of the mixing rotor correspond directly with the mixing periods determined by the main computer 2, and which are set forth in column 3 of Table 4.

The farmer on receiving particulars of the determined mixing regime set out in Table 4 on the first secondary computer 4 from the main computer 2 transfers the particulars of the mixing regime from the first secondary computer 4 to the minicomputer 15 of the mixing apparatus 15 via a memory stick. The minicomputer 15 displays an enquiry on the visual display 19 enquiring as to the number of animals in the herd to be fed. The farmer enters the number N of animals through the keypad 20. The minicomputer 15 computes the total weight of each ingredient to make up the animal feed by multiplying the respective weights thereof by the number N of animals. Thus, the total weight of ingredient A required is N×WA, and so on to ingredient G, which is N×WG. On the total weight of the ingredients being computed by the minicomputer 15, the minicomputer 15 then displays the first of the ingredients to be loaded into the mixing apparatus 5 based on the determined mixing regime, namely, ingredient A on the visual display 19 as well as the weight of the first ingredient to be loaded into the mixing apparatus 5.

As ingredient A is being loaded into the mixing apparatus 5, the microcomputer 19 counts down the remaining weight of the first ingredient to be loaded into the mixing apparatus 5. In other words, the amount of the first ingredient still outstanding to be loaded into the mixing apparatus is continuously updated on the visual display 19 as the first ingredient is being loaded into the mixing apparatus. On completion of loading of the first ingredient into the mixing apparatus 5, the next ingredient, namely, ingredient D to be loaded into the mixing apparatus 5 is displayed on the visual display 19 of the minicomputer 15, and the weight thereof to be loaded is also displayed on the visual display 19 of the minicomputer 15. If the next ingredient, namely, ingredient D is not to be loaded into the mixing apparatus 5 immediately on completion of loading of the first ingredient, the minicomputer 15 displays on the visual display 19 the number of revolutions of the mixing rotor 6 to be allowed until the next ingredient, namely, ingredient D is to be loaded, and counts down the number of revolutions of the mixing rotor 6 to the instant at which the next ingredient, namely, ingredient D is to be loaded, and so on until all the ingredients have been loaded.

As each ingredient is being loaded into the mixing apparatus 5, the amount outstanding of the ingredient still to be loaded into the mixing apparatus is continuously updated and displayed on the visual display 19. On completion of loading of the last of the ingredients into the mixing apparatus 5, namely, ingredient G, the minicomputer 15 then displays the number of revolutions of the mixing rotor 6 to which the ingredients in the mixing apparatus 5 are to be subjected in order to complete the mixing cycle under the mixing regime, and counts down the number of outstanding revolutions.

In this embodiment of the invention the minicomputer 15 is configured to output first and second alert signals to activate an audible and a visual alarm. The audible alarm is provided by a piezoelectric sounder 25, and the visual alarm is provided by a light 26, both of which are mounted on the minicomputer 15 or the mixing apparatus 5. The first alert signal is outputted by the minicomputer 15 in response to the amount outstanding of the ingredient currently being loaded into the mixing apparatus being reduced to a predefined amount in order to indicate to the farmer that loading of that ingredient is almost completed. The second alert signal is outputted in response to the amount of the ingredient already loaded into the mixing apparatus 5 being equal to the total amount of that ingredient to be loaded into the mixing apparatus, in order to indicate to the farmer that loading of that ingredient has been completed. The first alert signal is a pulsed signal for pulsing the sounder 25 and the light 26. The pulse frequency of the first alert signal progressively increases as loading of the ingredient currently being loaded continues, until the pulses merge to produce a continuous signal, which is the second alert signal to indicate loading of that ingredient has been completed. In this case the minicomputer 15 commences to output the first alert signal when the weight of each ingredient still outstanding to be loaded into the mixing apparatus 5 is 15% of the total weight of the ingredient.

The minicomputer 15 is configured to operate the sounder 25 for a period of five seconds to indicate when the mixing cycle has been completed, in other words, when the animal feed has been subjected to the total number of revolutions of the mixing rotor 6, which in the example of FIG. 4 is 85 revolutions.

During the mixing cycle of the mixing sequence of the ingredients of the set of ingredients in the mixing apparatus 5, the minicomputer 15 monitors the load cells 10 and the proximity sensor 11, and records the weight of each ingredient loaded into the mixing apparatus 5 and the number of revolutions of the mixing rotor 6 to which each ingredient has been subjected. This data is stored in the minicomputer 15, and at an appropriate time is transferred on the memory stick to the first secondary computer 4, and in turn to the main computer 2. A comparison of the actual weight of the ingredients and the actual number of revolutions of the mixing rotor 6 to which the ingredients were subjected during mixing of the set of ingredients may be made with the ideal values from the mixing regime, in order to ascertain the accuracy with which the animal feed has been mixed. This comparison may be made by the first secondary computer 4 or the main computer 2.

In cases where the animals to be fed are milking cows, the farmer receives a yield analysis from the dairy to which milk from the herd is supplied, and the yield analysis is entered into the first secondary computer 4 and cross-referenced with the actual weights of the ingredients loaded into the mixing apparatus and the number of revolutions of the mixing rotor 6 to which those ingredients were subjected in the mixing apparatus 5 on the day corresponding to the milk yield received from the dairy. The milk yield cross-referenced with the mixing data from the minicomputer 15 is then transmitted by the first secondary computer 4 to the main computer 2 via the internet. The main computer 2 carries out an analysis of the received data in order to determine trends in the feeding of the animals and the yields achieved therefrom. In the case of beef cattle, appropriate yield data and mixing data from the minicomputer 15 is inputted into the first secondary computer 4 and relayed via the internet to the main computer 2 for similar analysis of trends. The results of the analysis carried out by the main computer 2 are transmitted to the first secondary computer 4 over the internet to assist the farmer in optimising yields from animals fed by the animal feed produced by the determined mixing regime.

Figure 5:
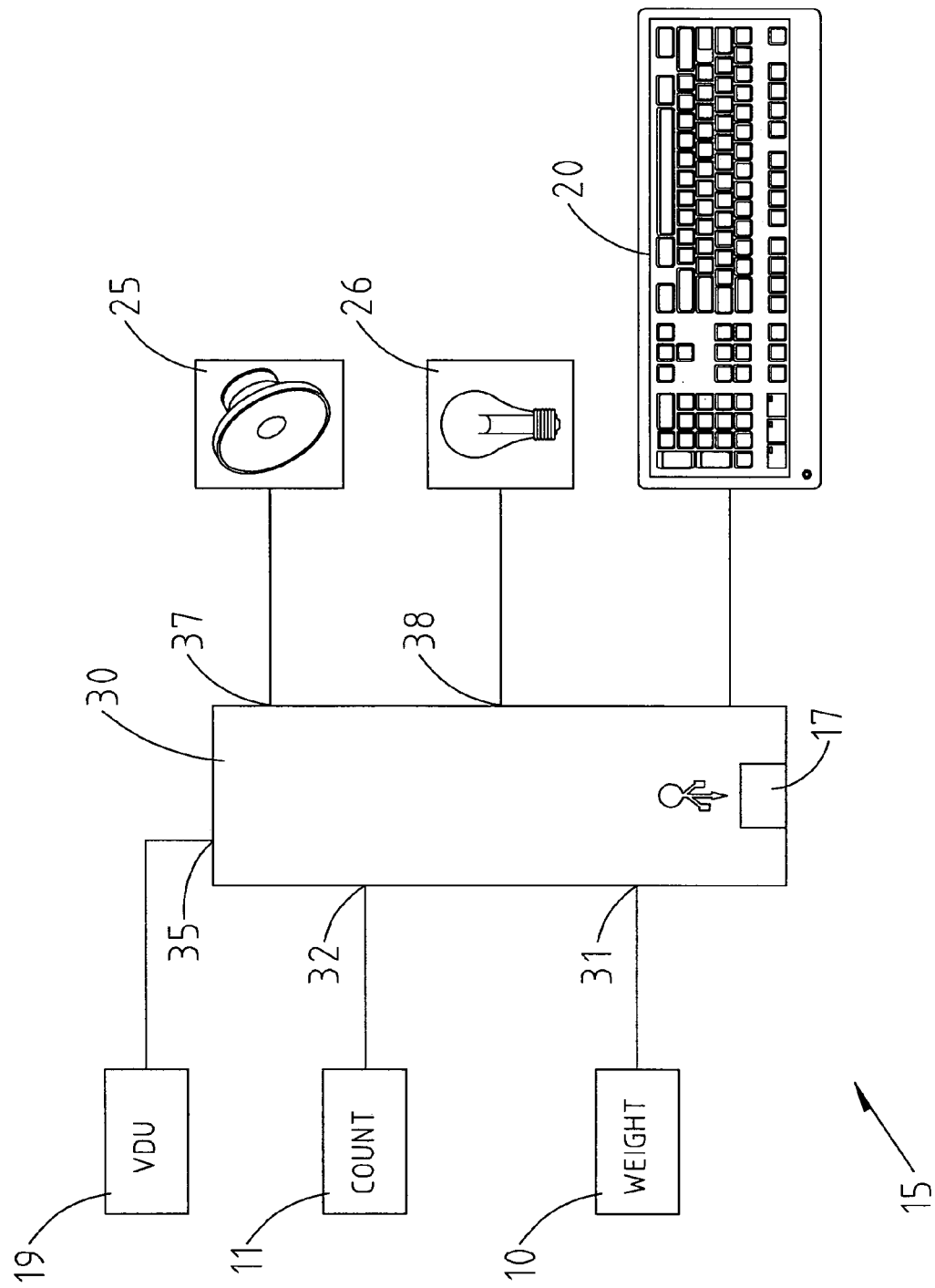
FIG. 5 is a block representation of a minicomputer of the system of FIG. 1.

Referring now to FIG. 5, the minicomputer 15 comprises a microprocessor 30 which is configured to receive inputs from the load cells 10 through a first input port 31 and to receive the count of the number of revolutions of the mixing rotor 6 from the counter 13 through a second input port 32. A first output port 35 from the microprocessor 30 outputs data to the visual display 19 for display thereon, and second and third output ports 37 and 38 from the microprocessor 30 output the alert signals to control the sounder 25 and the light 26, respectively.

The microprocessor 30 is programmed so that on a mixing regime for a set of ingredients of an animal feed being inputted through the USB port 17, the microprocessor 30 displays a query on the visual display 19 querying the number of animals of the herd to be fed with the animal feed. The microprocessor 30 then monitors the keypad 20 and reads the number inputted by the farmer through the keypad 20. The microprocessor 30 is programmed to then compute the total weights of the respective ingredients of the set thereof, and to output particulars of the first ingredient to be loaded into the mixing apparatus 5 as well as the total weight thereof for display on the visual display 19. With the mixing apparatus 5 operating and the mixing rotor 6 rotating, the microprocessor 30 monitors the load cells 10 and the counter 13.

On commencement of loading of the first ingredient into the mixing apparatus 5, the microprocessor 30 commences to count down the outstanding weight of the first ingredient based on signals received from the load cells 10 of the mixing apparatus 5. Also on commencement of loading of the first ingredient into the mixing apparatus, the microprocessor 30 commences to count the revolutions of the mixing rotor 6 from the signals received from the counter 13. When the amount outstanding of the first ingredient to be loaded into the mixing apparatus 5 is 15% of the total weight of the first ingredient, the microprocessor 30 outputs the first alert signal through the second output port 37 to pulse the sounder 25 and the first alert signal through the third output port 38 to pulse the light 26, the rate at which the pulses of the first alert signal are produced increasing as the outstanding amount of the first ingredient to be loaded into the mixing apparatus 5 approaches zero. On the microprocessor 30 determining that the required amount of the first ingredient has been loaded into the mixing compartment 5, the microprocessor 30 outputs the second alert signal, which is a continuous signal, through the second and third output ports 37 and 38 to the sounder 25 and the light 26 to operate the sounder 25 and the light 26 to produce a continuous signal for a predetermined time period, typically, 5 seconds.

On completion of loading of the first ingredient, the microprocessor 30 is programmed to output a signal to the visual display 19 to display particulars of the next ingredient and the weight thereof to be loaded. If the next ingredient is not to be loaded immediately after completion of loading of the previous ingredient, the microprocessor 30 is programmed to count down the number of revolutions of the mixing rotor 6 to the instant at which the next ingredient is to be loaded into the mixing apparatus 5, and the microprocessor 30 outputs a signal to the visual display 19 which displays the countdown of the revolutions of the mixing rotor. The microprocessor 30 is programmed to similarly operate during loading of remaining ingredients into the mixing apparatus 5.

The microprocessor 30 is programmed so that when the last of the ingredients has been loaded into the mixing apparatus 5, the microprocessor 30 outputs a signal to the visual display 19 to display the number of revolutions of the mixing rotor 6 to be carried out in order to complete the mixing regime. The microprocessor 30 outputs appropriate signals to the visual display 19 in order to count down the outstanding number of revolutions of the mixing rotor to complete the mixing cycle of the mixing regime. On the countdown reaching zero revolutions of the mixing rotor 6 the microprocessor 30 outputs a continuous signal to operate the sounder 25 and the light 26 to produce sound and light signals, respectively, continuously for a predetermined time period of five seconds.

The microprocessor 30 is also programmed so that during loading of the ingredients into the mixing apparatus 5, the microprocessor 30 stores the weight and identity of each ingredient loaded into the mixing apparatus 5 and the number of revolutions of the mixing rotor 6 to which each ingredient is subjected during the mixing cycle of the mixing regime. This stored data, as discussed above, is then transferred from the minicomputer 15 to the first secondary computer 4 by the memory stick, for subsequent transmission via the internet to the main computer 2.

Referring now to FIGS. 9 to 12, an example of a computer implemented method for determining a mixing regime for a set of ingredients for an animal feed in accordance with another embodiment of the invention will now be described. In this embodiment of the invention the ingredients are set out in a master table as categories of ingredients and the master table is configured as a look-up table, which is indicated generally by the reference numeral 50 in FIG. 9 and is stored in the main computer 2. The method according to this embodiment of the invention is particularly directed towards providing adequate chopping during the mixing regime of ingredients which require chopping, and additionally, is directed towards avoiding both over-chopping and under-chopping of the ingredients. In particular, the method according to this embodiment of the invention is specifically directed towards determining a mixing regime for a set of ingredients in which the ingredients are mixed in the mixing apparatus 5 of the type which simultaneously mixes and chops ingredients which require chopping, namely, a mixer/feeder wagon of the type of the mixer/feeder wagon described in PCT Published Specification No. WO 96/32836 and briefly described with reference to FIGS. 6 to 8.

The ingredients which require chopping are the fibrous type ingredients, such as silage, hay, straw, grass and other fibre ingredients, as well as root crops, for example, sugar beet and other similar type root crops. Ingredients such as granular material such as wheat, grain and the like, as well as concentrates, mineral additives and liquid and slurry type ingredients, do not require chopping and are of a size not to be affected by the mixing and chopping action of the mixing rotor, and therefore, within reason, may be subjected to unlimited numbers of revolutions of the mixing rotor 6 without deterioration of such ingredients. Accordingly, standard mixing periods for these ingredients are not provided in the look-up table 50 of FIG. 9.

The ingredients in the look-up table 50 for which standard mixing periods apply are categorised as being soft fibre ingredients, long fibre ingredients or root crops. Column 1 of the look-up table 50 sets forth the categories of ingredients as being soft fibre ingredients, long fibre ingredients and root crop ingredients. The ingredients are then sub-categorised into sub-categories of ingredients in column 2 of the look-up table 50 whereby the soft fibre ingredients are sub-categorised as being clamp silage, which is silage drawn from a silage clamp; baled silage (chopped), which is silage obtained from a bale of silage in which the silage had been chopped prior to baling, and typically, would be of fibre length of the order of 50 mm to 100 mm; baled silage unchopped, which is silage which is obtained from a bale of silage in which the silage had been baled in its unchopped state, and the fibre lengths would, in general, be of length greater than the chopped baled silage; and fresh grass.

The long fibre category of ingredients are sub-categorised into six sub-categories, namely, long fibres of grade 1 to grade 5, and also as lucerne. The long fibre materials which are sub-categorised as grade 1 to grade 5 are typically hay, straw and other relatively long ingredients in which the fibres have some rigidity. A long fibre grade 1 ingredient is an ingredient such as hay or straw in which the fibres are relatively brittle, and chop relatively easily. Such an ingredient would be, for example, a relatively rigid straw-like material. Long fibre grade 5 ingredients are ingredients in which the fibres are relatively long, but have limited rigidity, and are more difficult to chop, such ingredients, typically, would be poor quality hay. Lucerne, which is also a long fibre ingredient is sub-categorised as a separate ingredient. The category of root crop ingredients are sub-categorised as being unchopped, and typically, would be whole root crops.

Column 3 of the look-up table 50 sets forth the standard mixing periods based on the number of revolutions of the mixing rotor 6 in the mixing apparatus 5 to which the respective sub-categories of ingredients should be subjected during the mixing cycle of the mixing regime. Column 4 of the look-up table 50 sets forth the mixing factors based on the weight of ingredient per animal of the animal feed. However, in this embodiment of the invention two mixing factors are given for the soft fibre ingredients, and three mixing factors are given for the long fibre ingredients. In the case of the soft fibre ingredients, the mixing factor to be applied to the standard mixing period is 1.50 for those soft fibre ingredients which constitute between 20 kg and 30 kg per animal of the animal feed. The mixing factor for the soft fibre ingredients which constitute from 30.01 kg upwards per animal of the animal feed is 1.70. Those soft fibre ingredients which constitute less than 20 kg per animal of the animal feed require no mixing factor. Three mixing factors are provided for the long fibre ingredients, namely, the mixing factor of 1.50, which is to be applied to the standard mixing periods of those long fibre ingredients which constitute between 1.00 kg and 2.00 kg per animal of the animal feed; the mixing factor of 2.00 which is to be applied to the standard mixing periods of those long fibre ingredients which constitute between 2.01 kg and 3.00 kg per animal of the animal feed; and the mixing factor 3.00 which is applied to the standard mixing periods of those long fibre ingredients which exceed 3.00 kg per animal of the animal feed. No mixing factor is required to be applied to the standard mixing periods of long fibre ingredients which constitute below 1.00 kg per animal of the animal feed.

Column 5 of the look-up table 50 sets forth three mixing factors which relate to the weight of the animals to which the animal feed is to be fed, and these mixing factors are only to be applied to the standard mixing periods of the long fibre ingredients. The mixing factor of value 2.00 is to be applied to the standard mixing periods of the long fibre ingredients of animal feeds which are to be fed to animals of weight up to 100 kg. The mixing factor of value 1.66 is to be applied to the standard mixing periods for long fibre ingredients for animal feeds which are to be fed to animals of weight in the range of 101 kg to 300 kg. The mixing factor of value 1.33 is to be applied to the standard mixing periods of the long fibre ingredients for animal feeds which are to be fed to animals of weight exceeding 301 kg to 500 kg. No mixing factors are to be applied to the standard mixing periods for the long fibre ingredients for feeds which are to be fed to animals of weight greater than 500 kg.

Column 6 of the look-up table 50 includes mixing factors which relate to the type of mixing apparatus, and three mixing factors are provided; the first mixing factor of 0.90 is for a type A mixing apparatus; the mixing factor of 0.95 is for a type B mixing apparatus; and the mixing factor of 1.05 is for a type C mixing apparatus. A type A mixing apparatus is one which produces more rapid chopping of ingredients than a type B mixing apparatus, and a type B mixing apparatus is one which produces more rapid chopping than a type C mixing apparatus.

Referring now to FIG. 10, FIG. 10 sets out a set of ingredients from which a farmer wishes to prepare an animal feed. Column 1 of the table of FIG. 10 sets out the ingredients of the set of ingredients. Column 2 sets out the weight per animal of each ingredient. The number of animals to be fed is also set out in the table of FIG. 10, as is the average weight of the animals to be fed. The data in columns 1 and 2 of the table of FIG. 10, as well as the number of animals to be fed and the average weight thereof is transmitted by the farmer from the first secondary computer 4 to the main computer 2. The main computer 2 then classifies the ingredients into their respective categories and sub-categories from data already stored in the main computer 2 relating to the ingredients of that particular farmer. The ingredients of the table of FIG. 10 are categorised and sub-categorised as set out in the table of FIG. 11 by the main computer 2. Thereafter the main computer 2 prepares the mixing regime set forth in the table of FIG. 12 from the data in the table of FIG. 11 and from the look-up table 50 of FIG. 9.

The main computer 2 determines the mixing periods for those ingredients for which standard mixing periods are provided in the look-up table 50 of FIG. 9 from the corresponding standard mixing periods and any mixing factors which are to be applied to those ingredients. The straw ingredient is a long fibre ingredient of grade 4, and thus from column 3 of the look-up table 50 requires a standard mixing period of 96 revolutions of the mixing rotor 6 of the mixing apparatus 5. Since the average weight of the animals is greater than 500 kg, a mixing factor based on the average weight of the animals is not applicable. However, since the quantity of straw per animal of the set of ingredients is 1.2 kg, the mixing factor of 1.50 is to be applied to the standard mixing period of 96 revolutions of the mixing rotor. Additionally, the mixing apparatus 5 of the particular farmer is a type B mixing apparatus, and the mixing factor of 0.95 from column 6 of the look-up table 50 of FIG. 9 is also to be applied to the standard mixing period of 96 revolutions of the mixing rotor. Thus, by multiplying the standard mixing period of 96 revolutions of the mixing rotor by the mixing factor 1.5 and by the mixing factor 0.95 produces the required mixing period of 136 revolutions of the mixing rotor for the straw. As described above with reference to the look-up table 24 of FIG. 2, the type of mixing apparatus of each farmer is stored in the main computer 2, which in turn retrieves the relevant mixing factor from the look-up table 50.

The baled silage and the clamp silage respectively require mixing periods of 47 revolutions and 17 revolutions of the mixing rotor. No mixing factors based on the weight of the animals to be fed or on the weight of the ingredients are applicable to the standard mixing periods for the baled and clamp silage. However, the mixing factor of 0.95 for the type of the mixing apparatus of the farmer is applicable to both the baled and the clamp silage, and thus, by applying the mixing factor 0.95 based on the type of mixing apparatus of the farmer, the mixing periods required for the baled silage and the clamp silage are 45 revolutions and 16 revolutions, respectively, of the mixing rotor.

The main computer 2 in this embodiment of the invention is programmed to prepare the mixing regime so that the liquid ingredients, which in this case is molasses, are initially loaded into the mixing apparatus 5 at the commencement of the mixing cycle of the mixing regime. In this embodiment of the invention since the molasses is the only liquid ingredient, loading of the molasses is to commence at revolution no. 0 of the mixing rotor. Thus, on commencement of loading of the molasses into the mixing apparatus, the revolution of the mixing rotor is counted as revolution no. 0. The main computer 2 is also programmed to identify the mixing period required to allow completion of loading of the molasses, which is determined by the main computer 2 based on the weight of the molasses per animal and the number of animals to be fed with the animal feed, and in this embodiment of the invention is computed as being 20 revolutions of the mixing rotor. Since the next ingredient in the sequence which is to be loaded into the mixing apparatus 5 is straw, which requires a mixing period of 136 revolutions of the mixing rotor, loading of the straw is to commence at revolution no. 20 of the mixing rotor.

It has been found that the optimum period in a mixing cycle in which mineral additives and concentrates should be loaded is after commencement of the fibrous materials or other bulk materials, and preferably, during loading of the fibrous materials or bulk materials. Accordingly, in this embodiment of the invention the computer 2 is programmed to prepare the mixing regime to indicate the instants at which the mineral additives and concentrates which include the soyarape and blend after loading of the straw has commenced, and before loading of the straw is completed. Thus, in this case the mineral additive is to be added at revolution no. 30 of the mixing rotor. The soyarape is to be loaded at revolution no. 40 of the mixing rotor, while the blend is to be loaded at revolution no. 50 of the mixing rotor.

Accordingly, at the end of revolution no. 29 of the mixing rotor, loading of the straw is interrupted, and loading of the mineral additive commences at revolution no. 30, while loading of the soyarape commences at revolution no. 40 and loading of the blend commences at revolution no. 50. At revolution no. 60 loading of the remaining straw not already loaded prior to revolution no. 30 commences. Loading of the wheat which does not require a specific mixing period is to commence at revolution no. 100 of the mixing rotor. Loading of the baled silage which requires a mixing period of 45 revolutions of the mixing rotor is to be loaded at revolution no. 111 of the mixing rotor, while the clamp silage which requires a mixing period of 16 revolutions of the mixing rotor is to be loaded at revolution no. 140 of the mixing cycle. The mixing cycle then continues for a further 16 revolutions and terminates at revolution 156.

At the end of the mixing cycle of the determined mixing regime, the straw has been subjected to a mixing period of 136 revolutions of the mixing rotor as required, while the baled silage has been subjected to a mixing period of 45 revolutions of the mixing rotor and the clamp silage has been subjected to a mixing period of 16 revolutions of the mixing rotor, as required.

Referring now to FIGS. 13 and 14, an example of a computer implemented method according to another embodiment of the invention for determining a mixing regime for a set of ingredients for an animal will now be described. The method described with reference to FIGS. 13 and 14 is substantially similar to the method which has been described with reference to FIGS. 9 to 12. In this embodiment of the invention a master table, which is also configured as a look-up table, is illustrated in FIG. 13 and is indicated generally by the reference numeral 60. The look-up table 60 is stored in a suitable memory in the main computer 2, and is substantially similar to the look-up table 50 of FIG. 9, with the exception that the standard mixing periods for the soft and long fibre ingredients, and the root crops, instead of being provided as specific mixing periods, are provided as either maximum or minimum standard mixing periods to which the ingredients should be subjected during the mixing cycle of the mixing regime.

The maximum and minimum standard mixing periods in column 3 of the look-up table 60 are given as the maximum or minimum number of revolutions of the mixing rotor to which the soft fibre material, the long fibre material and the root crops should be subjected. The maximum and minimum standard mixing periods are similar to the standard mixing periods which are set out in column 3 of the look-up table 50 of FIG. 9. However, in this embodiment of the invention those mixing periods in column 3 of the look-up table 60 which are maximum standard mixing periods are identified as such with the letters "Mx" in column 3. Where a mixing period is identified as a maximum standard mixing period, the number of revolutions of the mixing rotor set out in column 3 to which the corresponding ingredient should be subjected is the maximum number of revolutions of the mixing rotor. Thus, those ingredients for which a maximum standard mixing period is given may be subjected to a lesser number of revolutions of the mixing rotor than those set forth in column 3 of the look-up table 60, but not more. Where the mixing period is given as a minimum standard mixing period, which is identified by the letters "Mn" in column 3, those ingredients for which a minimum standard mixing period is given must be subjected to the corresponding minimum number of revolutions of the mixing rotor, but may be subjected to a greater number of revolutions of the mixing rotor during a mixing cycle. All such maximum and minimum standard mixing periods are subject to the relevant mixing factors where appropriate. The advantage of providing the mixing periods as being either maximum or minimum standard mixing periods allows more flexibility in determining the mixing regime.

Additionally, in this embodiment of the invention the main computer is programmed to ensure that after the last ingredient of the sequence of ingredients to be loaded into the mixing apparatus 5, mixing of the animal feed therein continues for a further 18 revolutions of the mixing rotor from the instant at which the last of the ingredients to be loaded into the mixing apparatus 5 has been loaded therein. This, however, is subject to the last of the ingredients which are to be loaded into the mixing apparatus under the mixing regime requiring a maximum standard mixing period which is less than 18 revolutions of the mixing rotor. In which case, the mixing regime is set to terminate after the animal feed in the mixing apparatus 5 has been subjected to the maximum number of revolutions of the mixing rotor to which that ingredient is to be subjected after loading of that ingredient.

In the preparation of a mixing regime according to this embodiment of the invention, when determining the instants at which the respective ingredients are to be loaded into the mixing apparatus, the main computer 2 is programmed to ensure that where an ingredient is to be subjected to a minimum number of revolutions of the mixing rotor, that ingredient will be loaded into the mixing apparatus 5 at an instant during the mixing cycle to ensure that that ingredient is subjected to the minimum number of revolutions of the mixing rotor, and since the standard mixing period of such ingredients is the minimum number of revolutions of the mixing rotor, the mixing regime may be determined such that that ingredient is loaded into the mixing apparatus 5 at an instant in the mixing cycle such that the ingredient is subjected to more than the minimum number of revolutions of the mixing rotor. In the case of ingredients in which the standard mixing period is given as a maximum number of revolutions of the mixing rotor to which the ingredient is to be subjected, the mixing regime is determined so that those ingredients are loaded into the mixing apparatus 5 at an appropriate instant during the mixing cycle of the mixing regime to ensure that those ingredients are not subjected to more than the maximum number of revolutions of the mixing rotor.

In the preparation of a mixing regime, assuming the main computer is to determine a mixing regime for a similar set of ingredients as those set forth in FIG. 10, the mixing regime which is determined by the main computer is set out in FIG. 14. In this embodiment of the invention the maximum and minimum mixing periods to which the soft and long fibre ingredients are to be subjected are computed in a similar manner as described in the method which is described with reference to FIGS. 9 to 12. The maximum and minimum standard mixing periods are multiplied by the appropriate mixing factors as already described in order to determine the actual maximum and minimum numbers of revolutions of the mixing rotor to which those ingredients are to be subjected. The mixing periods are set out in column 3 of FIG. 14, and as can be seen, are similar to those set out in column 3 of FIG. 12, with the exception that instead of being precise numbers of revolutions of the mixing rotor to which the relevant ingredients are to be subjected, the mixing periods are the relevant maximum and minimum mixing periods to which the relevant ingredients are to be subjected.

In the case of the straw grade 4, the number of 136 revolutions of the mixing rotor to which the straw is to be subjected is the minimum number, however, since there is no reason why the straw cannot be loaded into the mixing apparatus 5 at revolution no. 20 of the mixing rotor, revolution no. 20 is selected as being the appropriate revolution of the mixing rotor at which loading of the straw into the mixer/feeder wagon should commence. Similarly in the case of the baled silage, the mixing period of 45 revolutions of the mixing rotor is the minimum number of revolutions of the mixing rotor to which the baled silage is to be subjected, and since there is no reason why the baled silage should not be loaded into the mixing compartment at revolution no. 111 of the mixing rotor, revolution no. 111 of the mixing rotor is selected as being the instant at which loading of the baled silage should commence.

However, the mixing period of 16 revolutions of the mixing rotor to which the clamp silage should be subjected is the maximum number of revolutions of the mixing rotor to which the clamp silage should be subjected. Accordingly, the instant at which the clamp silage should be loaded into the mixer/feeder wagon is at revolution no. 140 of the mixing rotor, since the straw is to be subjected to 136 revolutions of the mixing rotor, and thus the mixing cycle is not due to end until revolution no. 156 of the mixing rotor. Thus, the clamp silage by being loaded at revolution no. 140 is subjected to the computed maximum number of 16 revolutions of the mixing rotor by the end of the mixing cycle at revolution no. 156.

Since the maximum number of revolutions of the mixing rotor to which the clamp silage is to be subjected is 16, in this embodiment of the invention the mixing regime must terminate at 16 revolutions of the mixing rotor after the clamp silage has been loaded into the mixing apparatus rather than the normal 18 revolutions of the mixing rotor which should be carried out after the last of the ingredients has been loaded into the mixing apparatus.

In all the embodiments of the invention described, the numbers of revolutions of the mixing rotor selected for the standard mixing periods, the maximum standard mixing periods and the minimum standard mixing periods are selected to allow for the fact that loading of each ingredient cannot be carried out instantaneously, and loading of most of the ingredients for which standard mixing periods or maximum or minimum standard mixing periods are provided takes place over a number of revolutions of the mixing rotor. The standard mixing periods and the maximum and minimum standard mixing periods are selected to take account of this, and to avoid under-mixing and over-mixing.

It is also envisaged that as well as the standard mixing periods of the relevant ingredients being given as maximum standard mixing periods, the standard mixing periods could also be given as minimum standard mixing periods, whereby each ingredient would be given a maximum standard mixing period and a minimum standard mixing period. In which case, the main computer would be programmed to select the appropriate instant at which the ingredient should be loaded into the mixer/feeder wagon during the mixing cycle of the mixing regime based on the maximum and minimum standard mixing periods for the relevant ingredients.

Referring now to FIG. 15, there is illustrated a table showing the default order in which the ingredients according to their respective categories and sub-categories are ordered in a default loading sequence of the mixing regime. Column 3 of the table of FIG. 15 sets out the categories of ingredients. Column 2 sets out the sub-categories of ingredients, and column 1 sets out the order from one to twelve in which the ingredients of the categories and sub-categories are to be loaded into the mixing apparatus 5 in accordance with a default sequence. In the method for preparing the mixing regimes described with reference to FIGS. 1 to 14, the main computer is programmed, so that prior to determining the mixing periods for the ingredients of the categories and sub-categories for which standard mixing periods or maximum or minimum standard mixing periods are provided, the main computer 2 prepares a default sequence in which the ingredients of the set of ingredients are to be loaded into the mixing apparatus 5, based on the order in which the categories and sub-categories of the ingredients are ranked in the table of FIG. 15. The default sequence of Table 15 requires that most of the concentrate and liquid ingredients are to be loaded first, and then the unchopped root crops, if such are included in the set of ingredients, and so on through some of the soft fibre category of ingredients, and then most of the additional long fibre category of ingredients, further concentrates and mineral additives, another one of the additional long fibre ingredients, and so on to the last two soft fibre ingredients, namely, the clamp silage and the fresh grass which are last in the default loading sequence if such ingredients are included in the set of ingredients. Table 15 includes more categories and sub-categories of ingredients than are described in Tables 9 and 13. The sub-category of soft fibre ingredients, which are identified as Baled 1, Baled 2, Baled 3 and Baled 4 are baled silage, and the order in which these sub-categories of ingredients together with the sub-category of unchopped root crops is unimportant, since they all are indicated as being suitable for loading as the fifth ingredient in the sequence, assuming that four of the first five listed ingredients in Table 15 are included in the set of ingredients. However, in general, it is envisaged that only one or two of those sub-category ingredients which are indicated as being fifth in the sequence will be included in a set of ingredients for which a mixing regime is to be prepared. Similar comments apply to those ingredients which are indicated as being sixth, eighth, ninth and twelfth in the default sequence.

Once the default sequence for the set of ingredients has been prepared from the sequence set forth in Table 15, the main computer 2 then proceeds to determine the mixing periods for those categories and sub-categories of ingredients of the set of ingredients for which either standard mixing periods or maximum or minimum standard mixing periods are provided. Once the mixing periods for those ingredients have been determined by the main computer 2, the main computer 2 then prepares the mixing sequence for the set of ingredients by rearranging the sequence of the ingredients in the default sequence, if such rearranging is required, and sets out the instants based on the number of revolutions of the mixing rotor at which the respective ingredients are to be loaded into the mixing apparatus as set out in Tables 12 and 14.

In the event that after preparation of the sequence of the ingredients of the set of ingredients of the animal feed from the table of FIG. 15 for the default mixing regime, the main computer 2 is unable to obtain standard mixing periods, maximum standard mixing periods or minimum standard mixing periods for the ingredients from the look-up tables 24, 50 or 60, as the case may be, the main computer 2 confirms the default mixing regime as the mixing regime, which is then transmitted to the first secondary computer of the farmer.

While in the embodiments of the invention described the data relating to the set of ingredients of the animal feed which is transmitted from the first secondary computer to the main computer has been described as being based on the weight of the ingredients for the animal feed per animal, it will be readily apparent to those skilled in the art that the data transmitted by the first secondary computer to the main computer could include the total weight of each ingredient to produce a quantity of the animal feed sufficient to feed the number of animals of the herd. Additionally, while the main computer 2 returns the weight of each ingredient of the set of ingredients per animal to the first secondary computer, it is envisaged in certain cases that the main computer may compute the total amount of each ingredient of the animal feed based on the number of animals in the herd. However, where the number of animals in the herd is such that the total weight of the animal feed to be mixed for the herd of animals exceeds the capacity of the mixing apparatus, it is preferable for the main computer to transmit the weight of each ingredient per animal which had already been received from the first secondary computer back to the first secondary computer, thereby permitting the total weight of each ingredient of an animal feed to be computed by the minicomputer 15, which can then take account of the capacity of the mixing apparatus. However, since particulars of the mixing apparatus of each farmer are stored in memory in the main computer, the main computer could also undertake the computation which is carried out by the minicomputer 15.

While particular types of mixing factors have been described, it will be readily apparent to those skilled in the art that other mixing factors could also be incorporated, and some of the mixing factors described may not in all cases be necessary.

While the minicomputer has been described as being provided with a light and a piezoelectric sounder for alerting the farmer, any other suitable alerting means may be provided, and in certain cases, it is envisaged that the light may be omitted and only a sounder or other such siren may be provided.

Needless to say, it will be appreciated that each farmer will have a first secondary computer similar to the first secondary computer 4, a mixing apparatus and a minicomputer similar to the minicomputer 10. The mixing apparatus which each farmer will have may be different from farmer to farmer, however, in general, it is envisaged that all such mixing apparatus will include a chopping function.

While the master table has been described as being provided as a look-up table which comprises the ingredients or categories of ingredients as well as the standard mixing periods or maximum and minimum standard mixing periods, as well as the mixing factors, it is envisaged in certain cases that the mixing factors for the different non-standard conditions may be provided in separate look-up tables cross-referenced with the ingredients or categories of ingredients or sub-categories of ingredients, as the case may be.

It is also envisaged that the ingredients for which standard mixing periods are provided, instead of being provided with standard mixing periods, may be provided with both maximum standard mixing periods and minimum standard mixing periods. It is also envisaged that other categories of ingredients and other sub-categories of ingredients may be included in the look-up tables which include categories of ingredients and sub-categories of ingredients.

While specific standard mixing periods and maximum and minimum standard mixing periods have been described for the various ingredients, it will be readily apparent to those skilled in the art that these may be varied from time to time, depending on experience and the types of ingredients available. It will also be appreciated that mixing factors of other values may be provided.

While the first alert signals have been described as being initiated when the amount of each ingredient remaining to be loaded into the mixing apparatus has reached 15% of the total amount of that ingredient, it will be readily apparent to those skilled in the art that the first alert signals may be initiated at any suitable time during loading of the respective ingredients into the mixing apparatus. Indeed, in certain cases, it is envisaged that the first alert signals may be initiated when the amount of the ingredient remaining to be loaded into the mixing apparatus has reached 5% or 10% of the total amount of that ingredient to be loaded into the mixing apparatus.

While the methods, apparatus and systems according to the invention have been described in conjunction with mixing apparatus which is provided by a mixer/feeder wagon of the type disclosed in PCT Published Application Specification No. WO 96/32836, it is envisaged that the methods, apparatus and systems may be used in conjunction with any mixing apparatus, for example, any type of paddle type mixing apparatus, any type of auger type mixing apparatus and any type of tub type mixing apparatus, although, in general, it is envisaged that the methods, apparatus and systems will be used with mixing apparatus which incorporates a chopping function. It will also be appreciated that the mixing apparatus may be stationary mixing apparatus or mobile mixing apparatus, such as a mixer/feeder wagon, or indeed, may be any other suitable type of mixing apparatus.

While the transfer of data between the first secondary computer and the minicomputer has been described as via a memory stick, any other suitable data transfer means could be used, for example, by radio transmission, Bluetooth transmission or any other suitable transmission means. Needless to say, the first secondary computer may communicate with the main computer by any other suitable means besides the internet.

While the standard mixing periods and the maximum and minimum standard mixing periods have been defined as a function of the number of revolutions of the mixing rotor of a mixing apparatus to which the ingredients, categories of ingredients or sub-categories of ingredients are to be subjected, it will be appreciated that the standard mixing periods and the maximum and minimum standard mixing periods may be defined by any other means, for example, they may be defined as a function of time, and in which case, the instants at which the respective ingredients are to be loaded into the mixing apparatus would be defined as respective times from the commencement of a mixing cycle.

While the method for preparation of the mixing regime has been described as comprising the step of preparation of a default mixing regime, while this is preferable, it is not essential.

The invention claimed is:

1. A method for determining a mixing regime under which ingredients of a set of ingredients are to be mixed in the preparation of animal feed, the method comprising:
reading the ingredients from the set of ingredients,
obtaining standard mixing periods for at least some of the respective ingredients of the set thereof from a master table comprising a list of ingredients or categories of ingredients suitable for use in the preparation of animal feeds cross-referenced with corresponding standard mixing periods,
identifying any non-standard conditions identifiable from the read set of ingredients,
in response to a non-standard condition being identified, obtaining a mixing factor from mixing factors cross-referenced with at least some of the ingredients or categories of ingredients in the master table, for altering the standard mixing period obtained for a corresponding one of the ingredients of the set of ingredients to compensate for the identified non-standard condition,
determining the mixing periods to which the at least some of the ingredients of the set thereof are to be subjected during a mixing cycle of the mixing regime as a function of the corresponding standard mixing periods and any corresponding identified mixing factors, and
producing a loading sequence of the mixing regime in which the ingredients of the set of ingredients are to be loaded into mixing apparatus during the mixing cycle for mixing thereof to produce the animal feed, so that the ingredients for which mixing periods are determined are subjected to mixing for the corresponding determined mixing periods during mixing of the set of ingredients under the mixing regime.

2. A method as claimed in claim 1 in which the instants during the mixing cycle of the mixing regime at which the ingredients should be loaded into the mixing apparatus are defined in the mixing regime.

3. A method as claimed in claim 1 in which the proportion of each ingredient of the set of ingredients to produce the animal feed per animal is read.

4. A method as claimed in claim 1 in which the master table comprises the mixing factors cross-referenced with the corresponding ingredients or categories of ingredients.

5. A method as claimed in claim 1 in which the master table is stored in a computer readable medium.

6. A method as claimed in claim 1 in which each mixing factor is provided as a multiplier by which the standard mixing period of the corresponding ingredient or category of ingredients in the master table is to be multiplied in order to alter the standard mixing period for that ingredient or category of ingredients to compensate for the identified non-standard condition, the mixing factors being numbers which may be equal to, greater than or less than one.

7. A method as claimed in claim 1 in which the non-standard conditions may relate to any one or more of the following:
a characteristic of one of the ingredients of the set of ingredients,
a proportion of the set of ingredients constituted by one ingredient of the set of ingredients,
a characteristic of the set of ingredients,
a characteristic of an animal to which the animal feed is to be fed,
the size of the animal to which the animal feed is to be fed,
the mixing apparatus in which the ingredients of the set of ingredients are to be mixed to produce the animal feed,
the type of the mixing apparatus, and
the model of the mixing apparatus.

8. A method as claimed in claim 1 in which the method is adapted for determining the mixing regime for use in the mixing of the set of ingredients in a mixing apparatus which comprises a chopping function.

9. A method as claimed in claim 8 in which the method is adapted for determining the mixing regime for use in the mixing of the set of ingredients in a mixing apparatus in which the chopping function is carried out simultaneously with mixing of the ingredients in the mixing apparatus.

10. A method as claimed in claim 8 in which the method is adapted for determining the mixing regime for use in mixing of the set of ingredients in mixing apparatus comprising a mixing rotor rotatably mounted in a mixing chamber.

11. A method as claimed in claim 10 in which each standard mixing period is defined as a function of a number of revolutions of the mixing rotor of the mixing apparatus.

12. A method as claimed in claim 10 in which the mixing regime defines the instants at which the respective ingredients of the set of ingredients are to be loaded into the mixing apparatus as the numbers of revolutions of the mixing rotor which have elapsed from the commencement of the mixing cycle of the mixing regime at which the respective ingredients are to be loaded into the mixing apparatus.

13. A computer programme encoding a set of computer instructions for determining a mixing regime under which ingredients of a set of ingredients are to be mixed in the preparation of animal feed, which when running on a computer is adapted to perform a method as claimed in claim 1.

14. A computer programme stored on a computer readable storage medium having encoded thereon data and computer instructions for determining a mixing regime under which ingredients of a set of ingredients are to be mixed in the preparation of animal feed, for causing a computer to implement a method as claimed in claim 1.

15. A computer provided with or running a computer programme encoding a method for determining a mixing regime under which ingredients of a set of ingredients are to be mixed in the preparation of animal feed as claimed in claim 1.

16. A computer implemented method for determining a mixing regime under which ingredients of a set of ingredients are to be mixed in the preparation of animal feed, the computer implemented method comprising:
reading the ingredients from the set of ingredients into a computer,
obtaining standard mixing periods for at least some of the respective ingredients of the set thereof from a master table comprising a list of ingredients or categories of ingredients suitable for use in the preparation of animal feeds cross-referenced with corresponding standard mixing periods stored in a computer readable medium,
identifying any non-standard conditions identifiable from the read set of ingredients,
in response to a non-standard condition being identified, obtaining a mixing factor from mixing factors cross-referenced with at least some of the ingredients or categories of ingredients in the master table, for altering the standard mixing period obtained for a corresponding one of the ingredients of the set of ingredients to compensate for the identified non-standard condition,
determining the mixing periods to which the at least some of the ingredients of the set thereof are to be subjected during a mixing cycle of the mixing regime as a function of the corresponding standard mixing periods and any corresponding mixing factors, and
producing a loading sequence of the mixing regime in which the ingredients of the set of ingredients are to be loaded into mixing apparatus during the mixing cycle for mixing thereof to produce the animal feed, so that the ingredients for which mixing periods are determined are subjected to mixing for the corresponding determined mixing periods during mixing of the set of ingredients under the mixing regime.

17. Apparatus for determining a mixing regime under which ingredients of a set of ingredients are to be mixed in the preparation of animal feed, the apparatus comprising a main computer configured to store a master table comprising a list of ingredients or categories of ingredients suitable for use in the preparation of animal feeds cross-referenced with corresponding standard mixing periods, to store at least one mixing factor for at least some of the ingredients or categories of ingredients of the master table cross-referenced with the corresponding ingredient or category of ingredient, each mixing factor being adapted to be applied to the standard mixing period of the corresponding ingredient or category of ingredient for altering the standard mixing period thereof in response to a non-standard condition being identified in a set of ingredients for which a mixing regime is to be determined, to read the ingredients from the set of ingredients, to obtain standard mixing periods for at least some of the ingredients of the set of ingredients from the master table, to identify any non-standard conditions identifiable from the set of ingredients, to obtain a mixing factor from the stored mixing factors for one of the ingredients to compensate for an identified non-standard condition, in response to an identified non-standard condition, to determine the mixing periods for at least some of the ingredients of the set of ingredients to which those ingredients are to be subjected during a mixing cycle of the mixing regime as a function of the corresponding standard mixing periods and any corresponding mixing factors, and to produce a loading sequence of the mixing regime in which the ingredients of the set of ingredients are to be loaded into the mixing apparatus during the mixing cycle for mixing thereof to produce the animal feed, so that the ingredients for which mixing periods are determined are subjected to mixing for the respective corresponding determined mixing periods during mixing of the set of ingredients under the mixing regime.

18. A system for determining a mixing regime for use in the preparation of animal feed from a set of ingredients, the system comprising the apparatus as claimed in claim 17 and a first secondary computer, the first secondary computer being configured to be communicable with the main computer, and to facilitate inputting of the ingredients of the set of ingredients so that the main computer can read the inputted ingredients of the set of ingredients from the first secondary computer, and the main computer is configured to relay the determined mixing regime to the first secondary computer.

19. A system as claimed in claim 18 in which the system comprises mixing apparatus in which the ingredients are to be mixed, and a second secondary computer is provided associated with the mixing apparatus for indicating the loading sequence of the determined mixing regime under which the ingredients of the set of ingredients are to be loaded into the mixing apparatus during the mixing cycle of the mixing regime, a transfer means being provided for transferring the determined mixing regime from the first secondary computer to the second secondary computer.

20. A system as claimed in claim 19 in which a weighing means is provided on the mixing apparatus for weighing the ingredients as the ingredients are being loaded into the mixing apparatus, and the mixing apparatus comprises a mixing rotor for mixing the ingredients therein, and a monitoring means is provided for monitoring the number of revolutions of the mixing rotor, the second secondary computer being communicable with the weighing means and the monitoring means and being configured to read the current weight of ingredients in the mixing apparatus, and for reading the current number of revolutions of the mixing rotor to which the ingredients in the mixing apparatus have been subjected.

* * * * *